US012271525B2

(12) United States Patent
Harviainen

(10) Patent No.: US 12,271,525 B2
(45) Date of Patent: Apr. 8, 2025

(54) SYSTEMS AND METHODS FOR ADAPTING CONTENT TO THE HAPTIC CAPABILITIES OF THE CLIENT DEVICE

(71) Applicant: Adeia Guides Inc., San Jose, CA (US)

(72) Inventor: Tatu V. J. Harviainen, Helsinki (FI)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/214,279

(22) Filed: Jun. 26, 2023

(65) Prior Publication Data

US 2024/0427419 A1    Dec. 26, 2024

(51) Int. Cl.
*G06F 3/01*    (2006.01)
*G08B 6/00*    (2006.01)

(52) U.S. Cl.
CPC ............. *G06F 3/016* (2013.01); *G08B 6/00* (2013.01)

(58) Field of Classification Search
CPC .......... G06F 3/016; G06F 3/017; G06F 3/012; G06F 3/013; G08B 6/00
See application file for complete search history.

(56) References Cited

U.S. PATENT DOCUMENTS

| | | | |
|---|---|---|---|
| 7,990,374 B2 | 8/2011 | Itkowitz et al. | |
| 11,423,624 B2 | 8/2022 | Dedonato et al. | |
| 11,670,014 B2 | 6/2023 | Kreiner et al. | |
| 11,924,216 B2 * | 3/2024 | Thomas | H04L 63/062 |
| 2015/0302665 A1 * | 10/2015 | Miller | G06F 3/016 345/419 |
| 2015/0334430 A1 * | 11/2015 | Clapp | H04N 21/23116 725/92 |
| 2017/0075701 A1 | 3/2017 | Ricci et al. | |
| 2018/0084305 A1 * | 3/2018 | Sprenger | H04N 21/47217 |
| 2018/0227063 A1 | 8/2018 | Heubel et al. | |
| 2020/0026354 A1 | 1/2020 | Swindells | |

(Continued)

FOREIGN PATENT DOCUMENTS

WO    2023099233 A1    6/2023

OTHER PUBLICATIONS

Joachim Sachs et al., Adaptive 5G Low-Latency Communication for Tactile Internet Services, Sep. 4, 2018, Proceedings of the IEEE, vol. 107, No. 2, pp. 325-349 (Year: 2018).*

(Continued)

*Primary Examiner* — Tam T Tran
(74) *Attorney, Agent, or Firm* — Haley Guiliano LLP

(57) ABSTRACT

Systems and methods are presented herein for requesting a version of media content from a server that includes haptic feedback rending criteria compatible with the haptics capabilities of a client device. At a server, a request is received for a media asset for interaction on a haptic enabled client device, wherein the media asset comprises haptic feedback rendering criteria. Based on the request, haptic feedback capabilities of the haptic enabled client device associated with the request is determined. The haptic feedback capabilities of the haptic enabled client device are compared to the haptic feedback rendering criteria of one or more versions of the media asset available via the server. In response to the comparing, a version of the media asset comprising haptic feedback rendering criteria compatible with the haptic feedback capabilities of the haptic enabled client device is transmitted from the server to the haptic enabled client device.

20 Claims, 19 Drawing Sheets

(56) References Cited

U.S. PATENT DOCUMENTS

| | | | |
|---|---|---|---|
| 2020/0142484 A1 | 5/2020 | Maalouf et al. | |
| 2021/0150818 A1 | 5/2021 | Dedonato et al. | |
| 2023/0105481 A1 | 4/2023 | Kreiner et al. | |
| 2023/0249064 A1* | 8/2023 | Murphy | A63F 13/285 463/30 |
| 2023/0341941 A1 | 10/2023 | Clark et al. | |
| 2023/0410384 A1 | 12/2023 | Pajouh et al. | |

OTHER PUBLICATIONS

Elia Gatti et al., Haptic Rules! Augmenting the gaming experience in traditional games: The case of Foosball, Jun. 1, 2017, IEEE World Haptics Conference, pp. 432-435 (Year: 2017).*

Joeng-Mook Lim et al., An Audio-Haptic Feedbacks for enhancing User Experience, Jan. 1, 2013, IEEE International Conference on Consumer Electronics, pp. 49-50 (Year: 2013).*

Marco Gaudina et al., Virtual Social Multimedia Streaming with a Novel Haptic Device, May 1, 2012, Proceedings of the 35th International Convention MIPRO, pp. 1009-1016 (Year: 2012).*

Aittala, "Inverse lighting and photorealistic rendering for augmented reality," Visual Computer, 26:669-678 (2010).

Anonymous, "ETSI TR 126 928 V17.0.0 (May 2002), " Technical Report, 5G; Extended Reality (XR) in 5G 3GPP TR 26.928 version 17.0.0 Release 17) (2022) (133 pages).

Anonymous, "Get the lighting right," Platform-Specific Guides, Google ARCore Documentation (2023) (13 pages).

Bross et al., "Overview of the Versatile Video Coding (VVC) Standard and its Applications," IEEE Transactions on Circuits and Systems for Video Technology, 31(10):3736-3764 (2021).

Lai et al., "Furion: Engineering High-Quality Immersive Virtual Reality on Today's Mobile Devices," Paper Session VIII: Frameworks and Such, MobiCom'17, Oct. 16-20, 2017 (13 pages).

Ohlsson et al., "Reducing mobility interruption time in 5G networks," Ericsson Blog, Apr. 2, 2020 (9 pages).

Qualcomm Technologies, Inc., "Boundless XR and cloud gaming over 5G," QCCOMResearch (2021) (33 pages).

Rehman et al., "A Survey of Handover Management in Mobile HetNets: Current Challenges and Future Directions," Applied Sciences, 13(5):3367 (2023).

Siriwardhana et al., "A Survey on Mobile Augmented Reality With 5G Mobile Edge Computing: Architectures, Applications, and Technical Aspects," IEEE Communications Surveys & Tutorials, 23(2): 1160-1192, Secondquarter 2021.

Wang et al., "Learning Indoor Inverse Rendering with 3D Spatially-Varying Lighting," ICCV 2021 open access, Proceedings of the IEEE/CVF International Conference on Computer Vision (ICCV), 2021, pp. 12538-12547 (10 pages).

Xia, "New advances for haptic rendering: state of the art," The Visual Computer 34.2, 271-287 (2018).

"Common Test Conditions for MPEG Immersive Video", ISO/IEC JTC 1/SC29/WG04, N0203, Apr. 29, 2022.

"IEEE SA Standards Association—IEEE SA Beyond Standards", retrieved at https://standards.ieee.org/beyond-standards/, on Jun. 20, 2023.

"Immersion | Author Archives: Chris Ullrich", retrieved at https://www.immersion.com/author/cullrich/, on Jun. 20, 2023.

"The Haptics Industry Forum", retrieved at https://hapticsif.org/, Jun. 20, 2023.

Bastian, Matthias , "OpenXR aims to standardize "advanced haptics" for VR and AR", retrieved at https://mixed-news.com/en/openxr-aims-to-standardize-advanced-haptics-for-vr-and-ar/, Mar. 12, 2022.

Evans, Alun , et al., "A pipeline for the creation of progressively rendered web 3D scenes", Multimedia Tools and Applications, 2017, 1-28.

Kroon, Bart , "Call for MPEG immersive video test materials", retrieved at https://mpeg-miv.org/index.php/2022/05/11/call-for-mpeg-immersive-video-test-materials/, May 11, 2022.

Lavoue, Guillaume , et al., "Streaming Compressed 3D Data on the Web using JavaScript and WebGL", In: Proceedings of the 18th international conference on 3D web technology. ACM, 2013, 19-27.

Salisbury, Kenneth , et al., "Haptic Rendering: Introductory Concepts", IEEE Computer Graphics and Applications, 2004, 24-32.

Verschoor, M. , et al., "Tactile Rendering Based on Skin Stress Optimization", ACM Trans. Graph., vol. 39, No. 4, 2020, 1-13.

Zampoglou, Markos , et al., "Adaptive streaming of complex Web 3D scenes based on the MPEG-DASH standard", Multimedia Tools and Applications, 77.1, 2016, 125-148.

U.S. Appl. No. 18/214,283, filed Jun. 26, 2023, Tatu V.J. Harviainen.
U.S. Appl. No. 18/234,548, filed Aug. 16, 2023, Tatu V.J. Harviainen.
U.S. Appl. No. 18/518,023, filed Nov. 22, 2023, Tatu V.J. Harviainen.
U.S. Appl. No. 18/518,017, filed Nov. 22, 2023, Tatu V.J. Harviainen.

Anonymous , "ARcore", [Retrieved from https://developers.google.com/ar] (8 Pages).

Anonymous , "Augmented Reality-More to explore with ARKit 6", (Apple Inc) [Retrieved from: https://developer.apple.com/augmented-reality/arkit/] (4 pages).

Baroffio, Luca, et al., "Coding local and global binary visual features extracted from video sequences", IEEE Transactions on Image Processing, vol. 24, No. 11, pp. 3546-3560, Nov. 2015, (https://ieeexplore.ieee.org/abstract/document/7122888).

Li, Guangqiang , et al., "A deep-learning real-time visual SLAM system based on multi-task feature extraction network and self-supervised feature points", (Jan. 2021) (https://www.sciencedirect.com/science/article/abs/pii/S0263224120309374).

Ma, Jiayi , et al., "Image Matching from Handcrafted to Deep Features: A Survey", Int J Comput Vis 129, 23-79 (2021). https://doi.org/10.1007/s11263-020-01359-2 (167 pages).

Mehrabi, Abbas , et al., "Multi-Tier CloudVR: Leveraging Edge Computing in Remote Rendered Virtual Reality", ACM Transactions on Multimedia Computing, Communications, and Applications vol. 17 Issue 2 Article No. 49 pp. 1-24 (https://doi.org/10.1145/3429441).

Qu, Q. et al., "A Comprehensive Review of Machine Learning in Multi-objective Optimization", (2021 IEEE 4th International Conference on Big Data and Artificial Intelligence) (BDAI), (Qingdao, China), (2021, pp. 7-14).

* cited by examiner

SYSTEMS AND METHODS FOR ADAPTING CONTENT TO THE HAPTIC CAPABILITIES OF THE CLIENT DEVICE

BACKGROUND

The present disclosure is directed to systems and methods for adapting content (e.g., a media asset) to the haptic capabilities of a client device (e.g., a device for displaying and interacting with content), and more particularly, to systems and methods where the client device performs the adaptation of the graphics content based on the haptics capabilities metrics of the client device by requesting a version of the content, or elements of the content, from a server (e.g., a content platform delivery server) that includes haptic feedback rendering criteria compatible with the haptics capabilities of the client device.

SUMMARY

For extended reality (hereinafter "XR") experiences (e.g., augmented reality, virtual reality, or combinations thereof) to achieve an immersive (i.e., perceivable via multiple sensory capabilities that are synchronized with audio or visual stimuli) illusion of virtual elements being present in the physical space, haptics feedback will be an extremely important output modality (e.g., incorporating physical stimulus to the viewer of content). Haptics feedback devices are maturing. However, similar to the audio and visual capabilities of the client devices, the haptics feedback will always have limitations. In order to achieve best quality of experience, the feedback generated for the user should be consistent across all sensory channels (e.g., visual, audio and haptics feedback should all match each other in order to play together and not to break the illusion) and implementations of haptics enabled systems should avoid conflicts between outputs of different sensory channels.

Limitations of haptics feedback devices can, for example, determine for how small details in the virtual content the haptics feedback can generate feedback for. Additionally, the limitations of the devices may also affect the ability of the device to generate feedback for user perception corresponding to textures (e.g., soft or rough) based on types of tactile feedback the device can generate. In order to enable best possible experience for the end user consuming the XR experience on the client device, all sensory output generated for the user should be consistent. Where a device has limited haptics feedback capabilities, audio and visual output generated for the user should be adapted to match the limitations of the haptics feedback. One important aspect of adapting other output modalities to the haptics capabilities is how to ensure the original intent of the content creator is carried through despite the adaptation.

Haptics feedback is often identified as a key component missing from XR experiences of today, which can prevent rendering in entirety a full illusion of virtual elements being part of the user's reality. Some approaches may incorporate nascent haptic feedback devices. However, their use is currently mainly focusing on niche professional use cases such as surgery training based on limitations of capabilities of the devices for rendering the haptic feedback. Considering that haptics is such a key element for the next generation XR experiences, there is a strong push for haptics technology to mature towards being ready for widespread consumer use (e.g., beyond surgical applications and more directed to immersive entertainment uses). Once the technology starts to move into being common part of the client device capability, it is safe to assume that different feedback devices provided as add-on modules or embedded with the client devices, will have very heterogeneous capabilities. The problem caused by the fragmented haptics technology is identified by many players in the standardization field (e.g., OpenXR, Institute of Electrical and Electronics Engineers, and Haptics Industry Forum), and early work on addressing this issue is being started.

Immersive XR experiences are mostly distributed as single packages containing all the data and application logic in one big distribution package chunk. XR entertainment may increasingly employ similar streaming distribution strategies as is used with the video content. For example, Moving Picture Experts Group (hereinafter "MPEG") is actively working on standards for immersive media and has various fully immersive content developments in their roadmap. In addition to current single distribution package approach, especially adaptive streaming with Dynamic Adaptive Streaming over HTTP (hereinafter "DASH") approach is of interest within the scope of this disclosure. The complexity of requirements to which streaming media needs to adjust to is increasing. A combination of strategies, (e.g., MPEG-DASH) addresses dynamic variation in the streaming media distribution bandwidth with focus on video content. With immersive XR content, similar dynamic adaptive streaming will be needed but with a model that takes into an account requirements of immersive 3D rendering. Current state-of-the-art examples in adaptive 3D content streaming are focusing on just a single spatial content type and only graphics rendering, namely 3D data in polygon mesh format. These academic efforts expand content adjustment schema at the client side from just adjusting to bandwidth limitations to also adjusting to computing performance at the client side. Applicability of MPEG-DASH standard to transmit 3D data with multiple levels of detail (hereinafter "LoD") together with associated metadata is proposed as part of this disclosure. A progressive compression algorithm for 3D graphics data suitable for adaptive LoD streaming is preferrable.

In the case of client device being able to provide haptics feedback, the nature of the feedback can be limited. One approach to mitigate the shortcomings of the haptics feedback, would be the dynamic adjustment of the graphics content characteristics to accommodate fidelity of the haptics feedback. For example, if haptics can provide force feedback only to a certain resolution (e.g., fidelity in terms of small details) graphics content is automatically adjusted to remove details going below that threshold. Similarly, if the haptics feedback rendering lacks the simulation capabilities required for certain level of soft deformable material interaction, softness of the virtual materials in the scene could be automatically adjusted accordingly. The adaptation needs to be done case by case based on the client capabilities. The adaptation also needs to be done only for the elements that are part of the haptics rendering. In many cases, most of the XR experience content is not part of the haptics rendering and, therefore, should not be adapted to the haptics capabilities to avoid reducing the quality of experience purposelessly.

In some embodiments, the disclosure is directed to a method for accomplishing the above-described improvements. The method includes receiving, at a server, a request for a media asset for interaction on a haptic enabled device, wherein the media asset comprises haptic feedback rendering criteria. Based on the request, haptic feedback capabilities of the haptic enabled device associated with the request are determined. The haptic feedback capabilities of the haptic enabled device are compared to the haptic feedback rendering criteria of one or more versions of the media asset available via the server. A version of the media asset comprising haptic feedback rendering criteria compatible with the haptic feedback capabilities of the haptic enabled device is transmitted from the server to the haptic enabled device (e.g., based on the comparing).

In this solution, the client performs the adaptation of the graphics content based on the haptics capabilities metrics by requesting version of the content elements from the server that match the haptics capabilities of the client device. In the primary embodiment, the client device is performing both the graphics rendering and the haptics rendering by requesting both haptics and graphics assets from the server in a format that enables rendering on the client device using the metadata. In variations to the solution, it is also possible that the server performs the graphics rendering while the client performs the haptics rendering. Additionally, or alternatively, the server may even perform both the graphics and haptics rendering based on the client signaling the conditions to which the adaptation is addressing. In the content production, different versions of the graphics assets are produced to match different haptics feedback capabilities. In the streaming distribution model, description of the assets is compiled into a Media Presentation Description (hereinafter "MPD") file, which the client uses to request versions of the assets that match the haptic capabilities of the client device. In the single distribution package approach, the logic of adapting the content to the haptics feedback capabilities of the client is embedded with the application logic contained in the distribution package or it can be part of the more general viewing client software, such as a web browser.

In some embodiments, the server is configured to store a plurality of media assets, each media asset of the plurality of media assets comprising at least one haptic feedback rendering criteria. Additionally, or alternatively, the haptic feedback rendering criteria comprises one or more of kinesthetic feedback or tactile feedback. For example, the tactile feedback corresponds to one or more of texture of an object or response to manipulation of an object in one or more of an augmented or virtual reality display.

In some embodiments, the server corresponds to one or more content providers. The server may store at least two versions of the media asset (e.g., where each version of the at least two versions correspond to different haptic feedback rendering criteria such that different levels of haptic feedback are associated with each of the at least two versions). For example, at least one version of the at least two versions of the media asset comprises at least one haptic feedback rendering criteria. In some embodiments, the haptic feedback rendering criteria provides haptic resolution ranges required for the device to display the media asset.

In some embodiments, the method further comprises determining, based on the comparing, whether the haptic enabled device satisfies a minimum requirement of haptic feedback capabilities for displaying at least one version of the media asset via the haptic enabled device. The method may also include providing the at least one version of the media asset for display via the haptic enabled device by transmitting the at least one version of the media asset from the server to the haptic enabled device. The haptic feedback rendering criteria is stored via a media presentation description associated with the media asset.

BRIEF DESCRIPTIONS OF THE DRAWINGS

The above and other objects and advantages of the disclosure may be apparent upon consideration of the following detailed description, taken in conjunction with the accompanying drawings, in which.

Figure 18:
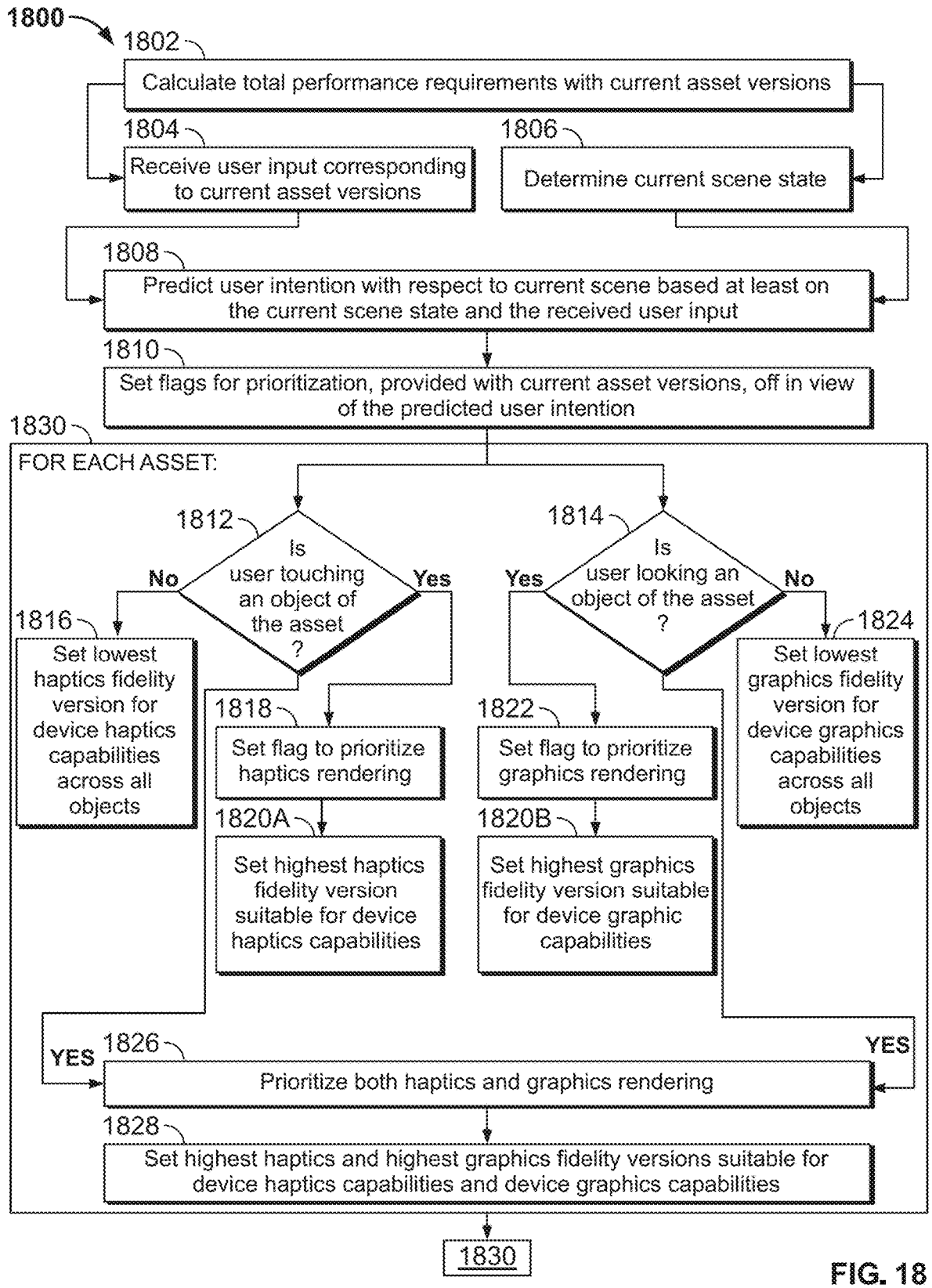
Figure 18:
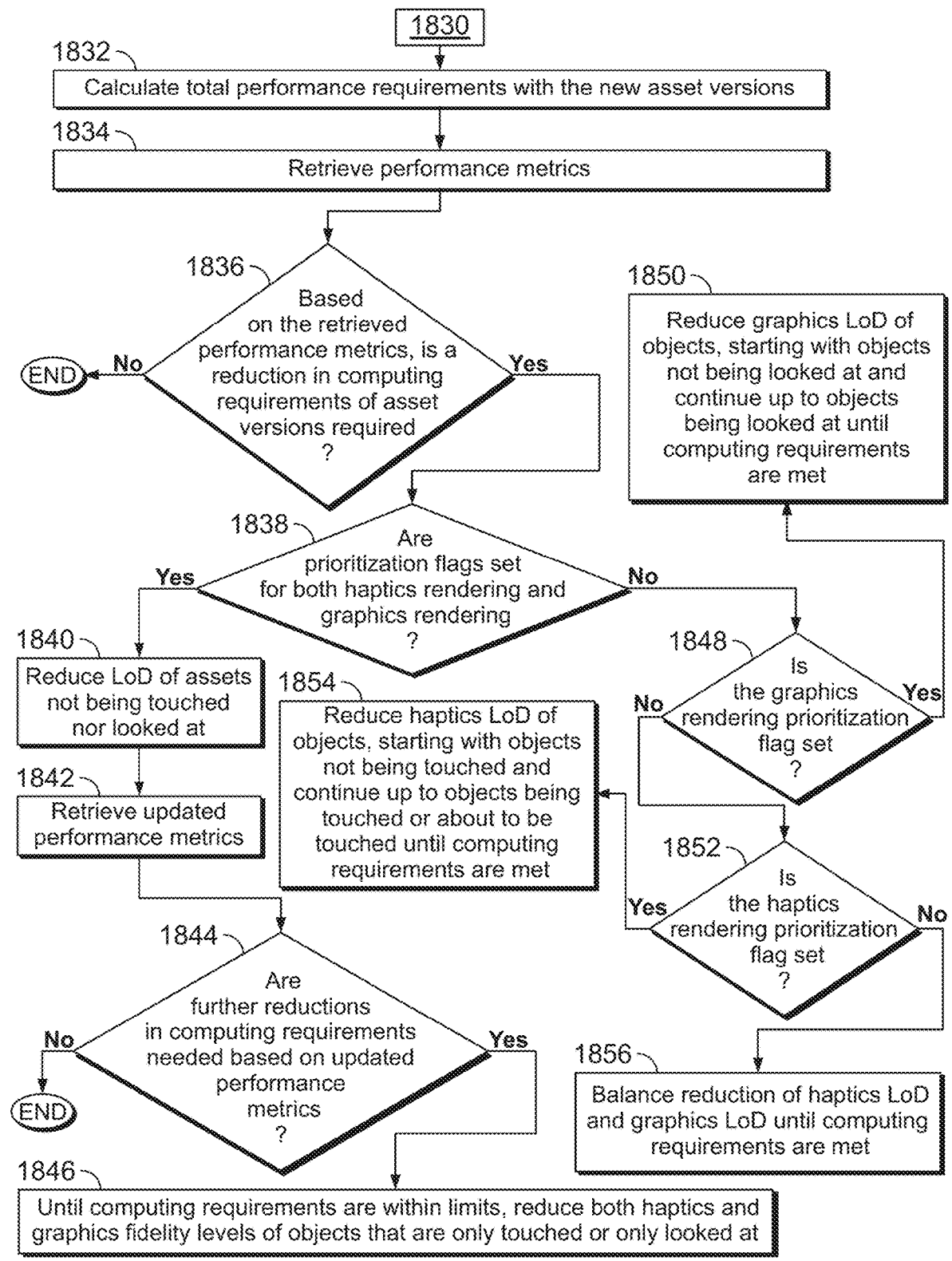
Figure 19:
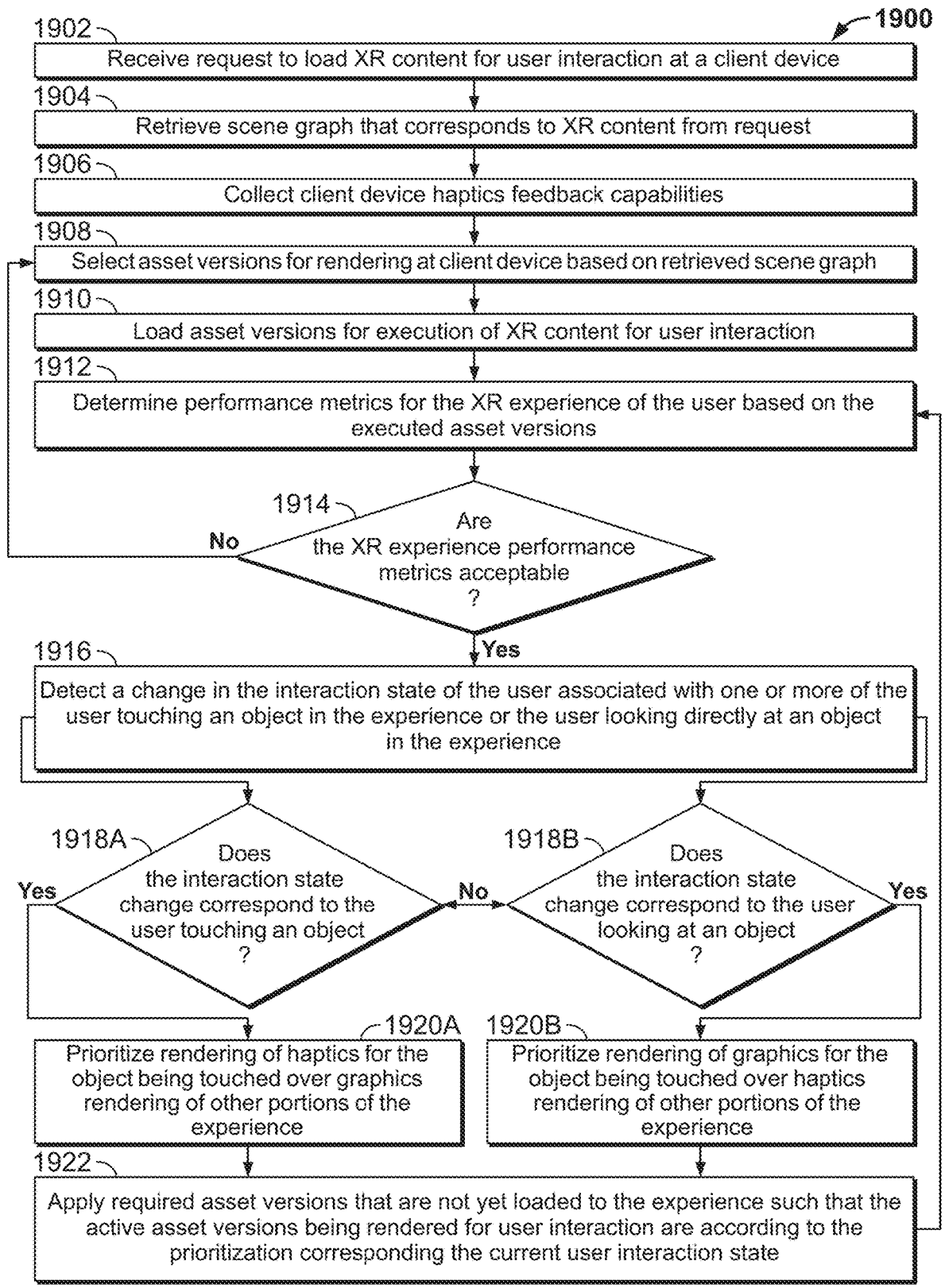

FIG. 18 is a flow chart representing an illustrative process for balancing haptic feedback rendering and graphics rendering of different aspects of a media asset, in accordance with some embodiments of the disclosure; and FIG. 19 is a flow chart representing an illustrative process for rendering a haptics enabled asset based on various settings corresponding to a haptics enabled client device, in accordance with some embodiments of the disclosure.

DETAILED DESCRIPTION

Methods and systems are provided herein for adapting content (e.g., a media asset) to the haptic capabilities of a client device based at least in part on available versions of the media asset, each version of the media asset having different haptic feedback rendering criteria compatible with different client devices.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, Blu-ray, CD, media cards, register memory, processor caches, Random Access Memory (RAM), etc.

Figure 1:
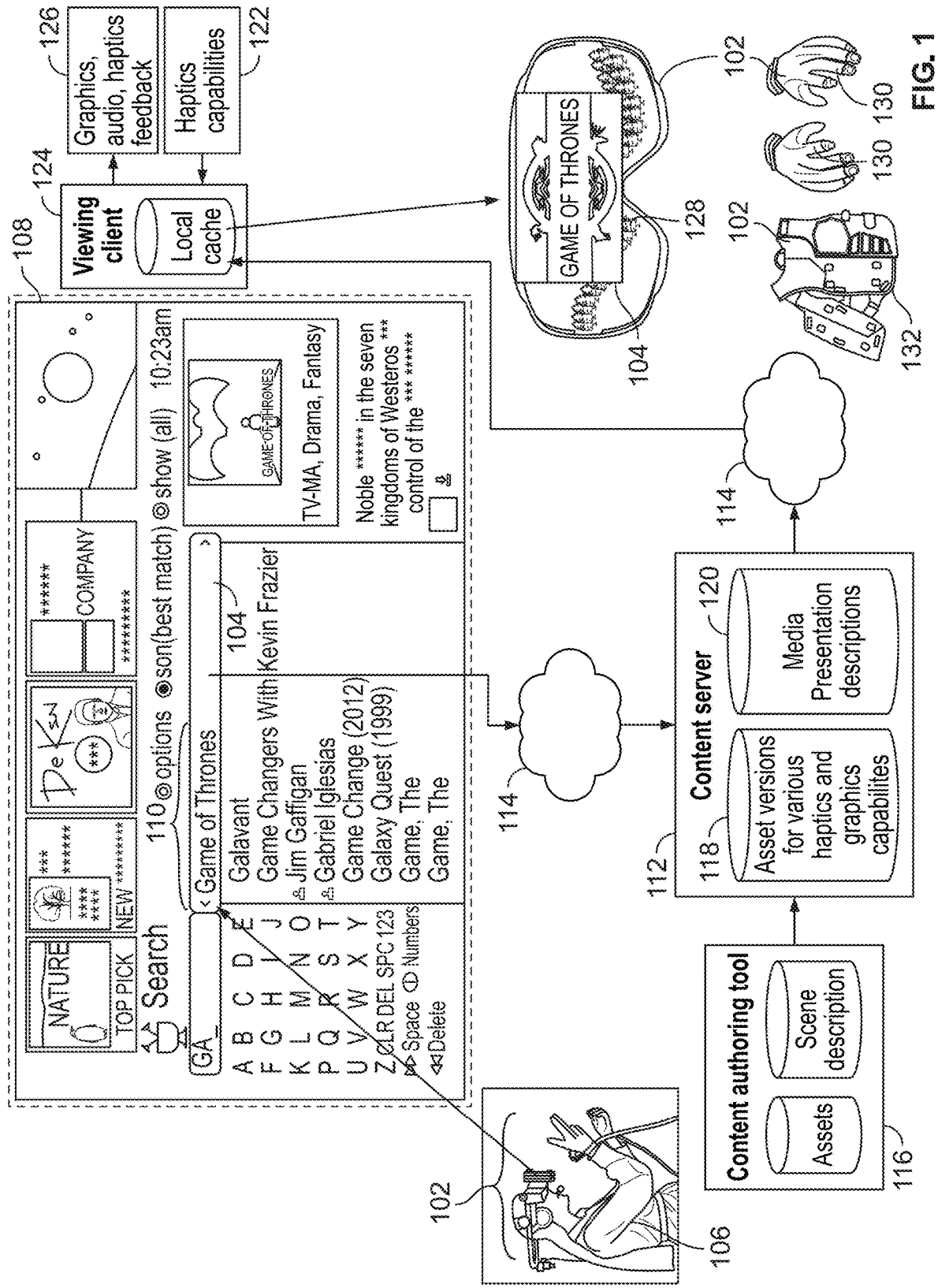
FIG. 1 illustrates a media asset rendering scenario based on a comparison of available versions of a media asset to haptics capabilities of a client device, in accordance with some embodiments of the disclosure.

FIG. 1 depicts media asset rendering scenario 100 where client device 102 is used to request a version of media asset 104 that has haptics feedback supportable by client device 102, in accordance with some embodiments of the disclosure. Media asset rendering scenario 100 may incorporate or be incorporated into any or all of the elements depicted in one or more of FIGS. 2-19. Media asset rendering scenario 100 may be executed, in whole or in part, by one or more components of the devices of FIGS. 2A and 2B, and may be executed using one or more steps of the methods depicted via FIG. 3, 4, 6, 7, 9, 12, 13, 18 or 19.

Media asset rendering scenario 100 shows user 106 interacting with media platform 108 using client device 102. Client device 102 is a haptic feedback enabled device (e.g., a haptics enabled device configured to provide haptic feedback to user 106 based on haptic responses provided as part of media asset 104. User 106 is shown requesting a version of media asset 104 via client device 102. The request may be a voice to text input, a text input based on a keyboard input, a text input based on eye movement tracking enabled by a head mounted aspect of client device 102, a selection of a media asset icon on a user interface, or combinations thereof. As shown in FIG. 1, user 106 has provided text string 110 to the shown user interface of media platform 108 to perform a search based on text string 110 to identify media asset 104. Media platform 108 receives the request at content server 112 through wireless network 114. Content server 112 is configured to receive media assets and multiple versions thereof from content authoring tool 116. Content authoring tool 116 may be independent from media platform 108, may be sourced by media platform 108, or some combination thereof, in order to provide access to user 106 to different versions of media asset 104 via content server 112.

Content server 112 receives the user request based on information transmitted from client device 102 through wireless network 114 to content server 112 in order to identify a version of media asset 104 available via content server 112 to transmit through wireless network 114 for rendering at client device 102. As shown in FIG. 1, content server 112 is configured to store media asset versions 118 and corresponding media presentation descriptions (MPDs) 120. Each of MPDs 120 provide information related to haptics capabilities enabled by each of media asset versions 118. For example, a first version of media asset versions 118 may result in a version of media asset 104 being transmitted to client device 102 that enables haptic feedback via hand sensors of client device 102 while a second version of media asset versions 118 may result in a version of media asset 104 being transmitted to client device 102 that lacks any haptic feedback enablement during rendering of media asset 104. The selection or determination at content server 112 of which version of media asset 104 to transmit to client device 102 is based at least in part on haptic feedback settings 122 as stored on or accessible via viewing client 124.

Viewing client 124 corresponds to one or more processing units of client device 102 that enables a local cache (e.g., a portion of memory of client device 102) to be used to receive transmitted portions of media asset 104 from content server 112 through wireless network 114 such that haptics capabilities 122 and device settings 126 can be compared to MPD 120 of media asset 104. Haptics capabilities 122 include a list of haptic feedback options that can be rendered by client device 102 for perception by user 106. For example, if user 106 only uses head mounted display 128, then content server 112 will identify and transmit one of media asset versions 118 with MPD 120 corresponding to haptic feedback rendering by head mounted display 128. In another example, if user 106 uses head mounted display 128 and pairs haptic hand sensors 130 to have client device 102 capable of rendering haptic feedback based on these two devices, then client server 112 will transmit one of media asset versions 118 with MPD 120 corresponding to haptic feedback rendering by both head mounted display 128 and haptic hand sensors 130. In some embodiments, client device 102 transmits data related to device settings 126 and haptics capabilities 122 to content server 112 for identifying which of media asset versions to identify for transmission to viewing client 124 of client device 102 based at least in part on a comparison of one or more of device settings 126 or haptics capabilities 122 to one or more of MPDs 120 in order to identify a proper version of media asset 104 to transmit. In some embodiments, client device 102 further comprises haptic vest 132, which is configured to generate haptic feedback around the torso of user 106. Haptic vest 132 is communicatively coupled and synchronized with head mounted display 128 and haptic hand sensors 130 to provide an immersive experience of media asset 104 for user 106.

Figure 2A:
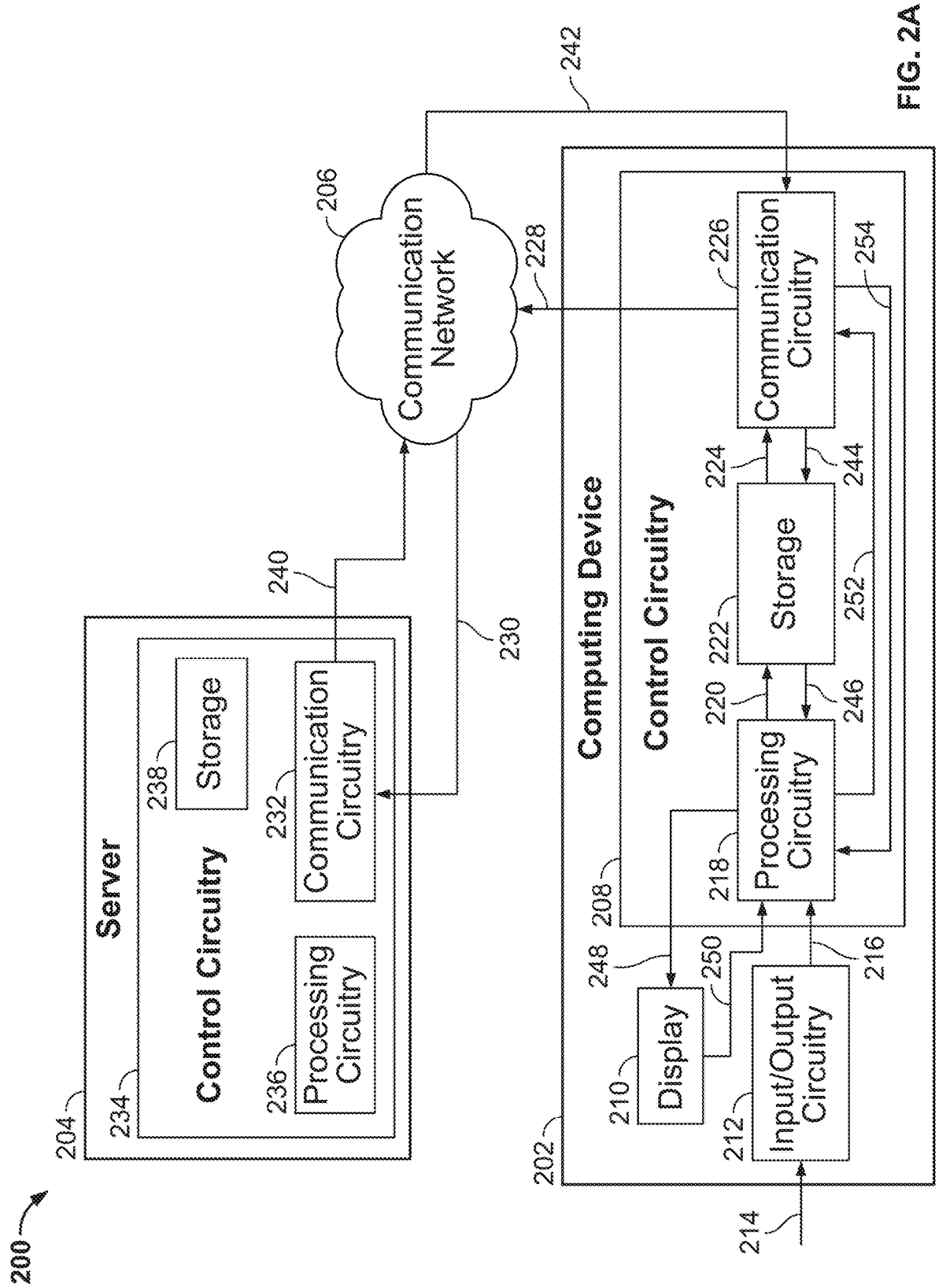
FIGS. 2A and 2B depict exemplary client devices, in accordance with some embodiments of the disclosure.

FIG. 2A depicts system 200, which includes an exemplary client device interfacing with an exemplary server, in accordance with some embodiments of the disclosure. System 200 is shown to include a computing device 202, a server 204 and a communication network 206. It is understood that while a single instance of a component may be shown and described relative to FIG. 2, additional instances of the component may be employed. For example, server 204 may include, or may be incorporated in, more than one server. Similarly, communication network 206 may include, or may be incorporated in, more than one communication network. Server 204 is shown communicatively coupled to computing device 202 through communication network 206. While not shown in FIG. 2, server 204 may be directly communicatively coupled to computing device 202, for example, in a system absent or bypassing communication network 206.

Communication network 206 may comprise one or more network systems, such as, without limitation, an internet, LAN, WIFI or other network systems suitable for audio processing applications. In some embodiments, system 200 excludes server 204, and functionality that would otherwise be implemented by server 204 is instead implemented by other components of system 200, such as one or more components of communication network 206. In still other embodiments, server 204 works in conjunction with one or more components of communication network 206 to implement certain functionality described herein in a distributed or cooperative manner. Similarly, in some embodiments, system 200 excludes computing device 202, and functionality that would otherwise be implemented by computing device 202 is instead implemented by other components of system 200, such as one or more components of communication network 206 or server 204 or a combination. In still other embodiments, computing device 202 works in conjunction with one or more components of communication network 206 or server 204 to implement certain functionality described herein in a distributed or cooperative manner.

Computing device 202 includes control circuitry 208, display 210 and input circuitry 212. Control circuitry 208 in turn includes communication circuitry 226, storage 222 and processing circuitry 218. In some embodiments, computing device 202 or control circuitry 208 may be configured as computing device 202 of FIG. 2B.

Server 204 includes control circuitry 234 and storage 238. Each of storages 222 and 238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 222, 238 may be used to store various types of content, metadata, and or other types of data (e.g., they can be used to store user statistics or group statistics, difficult level values, user and plurality of user performance data or user performance metric, starting and endings of checkpoints, data relating to home automation devices and their settings and any user preferences, lists of recommendations and remedial actions, and ML, and AI algorithms). Non-volatile memory may also be used (e.g., to launch a boot-up routine and other instructions). Cloud-based storage may be used to supplement storages 222, 238 or instead of storages 222, 238. In some embodiments, data relating to displaying an extend reality experience, setting difficulty levels in an extended reality experience, to obtaining user metrics during an extended reality experience, such as an immersive XR or AR media asset, from a plurality of users to generate median data, comparing median data with a current user's current data to determine whether the current user is or will be experiencing similar outcomes in the extended reality experience, determining starting and ending checkpoints for monitoring a current user, providing remedial actions based on user or plurality of user performance, managing difficulty levels and adjusting as needed based on user interactions, managing motion sickness, performing home automation functions, and executing artificial intelligence or machine learning algorithms to manage difficulty levels, motion sickness, or home automation, and data relating to all other processes and features described herein, may be recorded and stored in one or more of storages 222, 238.

In some embodiments, control circuitry 234 and/or 208 executes instructions for an application stored in memory (e.g., storage 238 and/or storage 222). Specifically, control circuitry 234 and/or 208 may be instructed by the application to perform the functions discussed herein. In some implementations, any action performed by control circuitry 234 and/or 208 may be based on instructions received from the application. For example, the application may be implemented as software or a set of executable instructions that may be stored in storage 238 and/or 222 and executed by control circuitry 234 and/or 208. In some embodiments, the application may be a client/server application where only a client application resides on computing device 202, and a server application resides on server 204.

The application may be implemented using any suitable architecture. For example, it may be a stand-alone application wholly implemented on computing device 202. In such an approach, instructions for the application are stored locally (e.g., in storage 222), and data for use by the application is downloaded on a periodic basis (e.g., from an out-of-band feed, from an internet resource, or using another suitable approach). Control circuitry 208 may retrieve instructions for the application from storage 222 and process the instructions to perform the functionality described herein. Based on the processed instructions, control circuitry 208 may determine a type of action to perform in response to input received from input circuitry 212 or from communication network 206. Other such processes are described at least in FIG. 3, 4, 6, 7, 9, 12, 13, 18 or 19.

In client/server-based embodiments, control circuitry 208 may include communication circuitry suitable for communicating with an application server (e.g., server 204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 206). In another example of a client/server-based application, control circuitry 208 runs a web browser that interprets web pages provided by a remote server (e.g., server 204). For example, the remote server may store the instructions for the application in a storage device. The remote server may process the stored instructions using circuitry (e.g., control circuitry 208) and/or generate displays. Computing device 202 may receive the displays generated by the remote server and may display the content of the displays locally via display 210. This way, the processing of the instructions is performed remotely (e.g., by server 204) while the resulting displays, such as the display windows described elsewhere herein, are provided locally on computing device 202. Computing device 202 may receive inputs from the user via input circuitry 212 and transmit those inputs to the remote server for processing and generating the corresponding displays. Alternatively, computing device 202 may receive inputs from the user via input circuitry 212 and process and display the received inputs locally, by control circuitry 208 and display 210, respectively.

Server 204 and computing device 202 may transmit and receive content and data such as objects, frames, snippets of interest, and input from primary devices and secondary devices, such as AR or XR devices. Control circuitry 234, 208 may send and receive commands, requests, and other suitable data through communication network 206. Control circuitry 234, 208 may communicate directly with each other using communication circuitry 226 and 232, respectively, avoiding communication network 206.

Figure 2B:
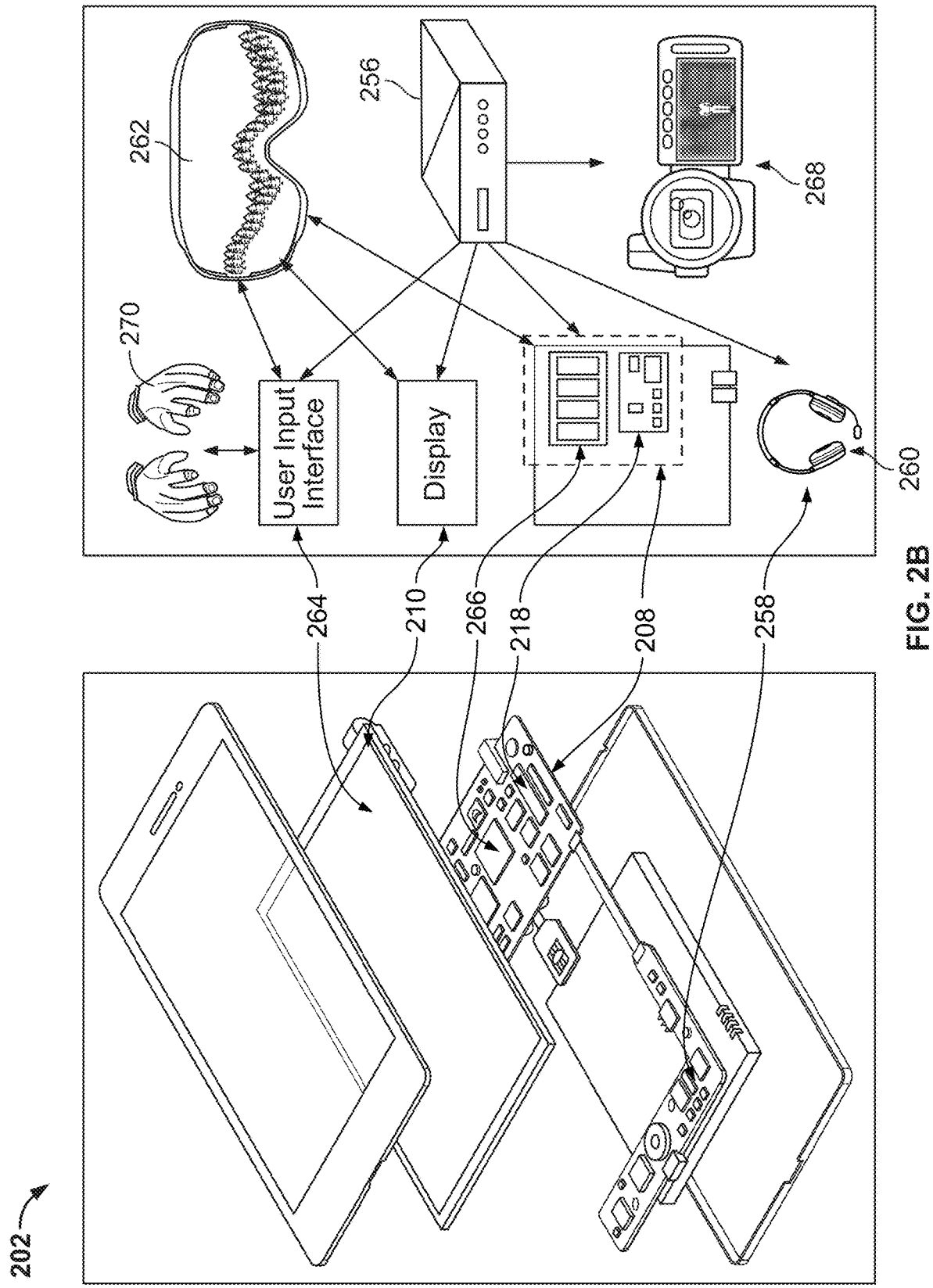

It is understood that computing device 202 is not limited to the embodiments and methods shown and described herein. In nonlimiting examples, computing device 202 may be a virtual, augmented, or mixed reality headset, smart glasses, or a device that can perform function in the metaverse (e.g., as shown in FIGS. 1 and 2B), a primary device, a personal computer (PC), a laptop computer, a tablet computer, a WebTV box, a personal computer television (PC/TV), a PC media server, a PC media center, a handheld computer, a mobile telephone, a smartphone, or any other device, computing equipment, or wireless device, and/or combination of the same capable of suitably displaying primary content and secondary content.

Control circuitry 234 and/or 208 may be based on any suitable processing circuitry such as processing circuitry 218 and/or 236, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 234 and/or control circuitry 208 are configured to display an extend reality experience, set difficulty levels in an extended reality experience, to obtain user metrics during an extended reality experience, such as an AR or XR immersive media asset configured to be rendered by a client device with haptic feedback capabilities, from a plurality of users to generate median data, compare median data with a current user's current data to determine whether the current user is or will be experiencing similar outcomes in the extended reality experience, determine starting and ending checkpoints for monitoring a current user, provide remedial actions based on user or plurality of user performance, manage difficulty levels and adjust as needed based on user interactions, manage motion sickness, perform home automation functions, and execute artificial intelligence or machine learning algorithms to manage difficulty levels, motion sickness, or home automation, and perform all processes described and shown in connection with flowcharts 1, 7, 9, and 13A, 13B.

User input 204 may be received from virtual, augmented or mixed reality headsets, mobile data, smart glasses. Transmission of user input 204 to computing device 202 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, 5G, or any other suitable wireless transmission protocol. Input circuitry 212 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, 5G, or other wireless transmission protocols.

Processing circuitry 218 may receive input 204 from input circuit 212. Processing circuitry 218 may convert or translate the received user input 204 that may be in the form of voice input into a microphone, or movement or gestures to digital signals. In some embodiments, input circuit 212 performs the translation to digital signals. In some embodiments, processing circuitry 218 (or processing circuitry 236, as the case may be) carries out disclosed processes and methods. For example, processing circuitry 218 or processing circuitry 236 may perform processes as described in reference to FIG. 3, 4, 6, 7, 9, 12, 13, 18 or 19.

FIG. 2B shows a generalized embodiment of computing device 202 from FIG. 2A, corresponding to at least a portion of client device 102 of FIG. 1, in accordance with some embodiments of the disclosure. Computing device 202 may be a smartphone device, a tablet, a virtual reality or augmented reality device, or any other suitable device capable of processing data corresponding to an immersive haptic feedback enabled media asset. In another example, a user equipment device, such as a user television equipment system or streaming interface device, may include media access device 256. Media access device 256 may be communicatively connected to haptic enabled headset 258, audio input equipment (e.g., headset microphone 260), and display 210. In some embodiments, display 210 may be a television display or a computer display. In some embodiments, display 210 may be a display in an HMD or an XR device. As shown in FIG. 2B, display 210 may be communicatively coupled to or may comprise head mounted display 262, which also is shown in FIG. 2B as being communicatively coupled to one or more of user input interface 264 (e.g., may display user input interface 264 with capabilities to receive user inputs via input/output circuitry 212 of FIG. 2A) or haptic feedback hand devices 270 (e.g., configured to enable a user to provide inputs to user input interface 264 as the user would by a remote or a communicatively coupled computer mouse or joystick), while also being communicatively coupled to media access device 256. In some embodiments, user input interface 264 may be a remote-control device. Media access device 256 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of computing device 202 and user equipment device 801 may receive content and data via input/output (I/O) path (e.g., circuitry) 266, which may communicatively interface with head mounted display 262. I/O path 266 may provide content (e.g., broadcast programming, on-demand programming, Internet content, content available over a local area network (LAN) or wide area network (WAN), and/or other content) and data to control circuitry 208, which may comprise processing circuitry 218 and storage 222 of FIG. 2A. Control circuitry 208 may be used to send and receive commands, requests, and other suitable data using I/O path 266, which may comprise I/O circuitry. I/O path 266 may connect control circuitry 208 (and specifically processing circuitry 218) to one or more communications paths (described below). I/O functions may be provided by one or more of these communications paths, but are shown as a single path in FIG. 2B to avoid overcomplicating the drawing. While media access device 256 is shown in FIG. 2B for illustration, any suitable computing device having processing circuitry, control circuitry, and storage may be used in accordance with the present disclosure. For example, media access device 256 may be replaced by, or complemented by, a personal computer (e.g., a notebook, a laptop, a desktop), a smartphone (e.g., device 202), a tablet, a network-based server hosting a user-accessible client device, a non-user-owned device, any other suitable device, or any combination thereof.

Control circuitry 208 may be based on any suitable control circuitry such as processing circuitry 218. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 208 executes instructions for the immersive video application stored in memory (e.g., storage 222 or 238 of FIG. 2A). Specifically, control circuitry 208 may be instructed by the immersive video application to perform the functions discussed above and below. In some implementations, processing or actions performed by control circuitry 208 may be based on instructions received from the immersive video application.

In client/server-based embodiments, control circuitry 208 may include communications circuitry suitable for communicating with a server or other networks or servers. The immersive video application may be a stand-alone application implemented on a device or a server. The immersive video application may be implemented as software or a set of executable instructions. The instructions for performing any of the embodiments discussed herein of the immersive video application may be encoded on non-transitory computer-readable media (e.g., a hard drive, random-access memory on a DRAM integrated circuit, read-only memory on a BLU-RAY disk, etc.). For example, in FIG. 2B, the instructions may be executed by control circuitry 208 of computing device 202 while being stored via one or more processors shown in FIG. 2A.

In some embodiments, the immersive video application may be a client/server application where only the client application resides on computing device 202, and a server application resides on an external server (e.g., server 204 of FIG. 2A). For example, the immersive video application may be implemented partially as a client application on control circuitry 208 of computing device 202 and partially on server 204 as a server application running on control circuitry 234. Server 204 may be a part of a local area network with one or more of computing devices 202 or may be part of a cloud computing environment accessed via the internet. In a cloud computing environment, various types of computing services for performing searches on the internet or informational databases, providing seamless virtual space traversing capabilities, providing storage (e.g., for a database) or parsing data (e.g., using machine learning algorithms) are provided by a collection of network-accessible computing and storage resources (e.g., server 204 and multiples of computing device 202), referred to as "the cloud." Computing device 202 may be a cloud client that relies on the cloud computing capabilities from server 204 to determine whether processing (e.g., at least a portion of virtual background processing and/or at least a portion of other processing tasks) should be offloaded from the mobile device, and facilitate such offloading. When executed by control circuitry of server 204, the immersive video application may instruct control circuitry 234 or 208 to perform processing tasks for the client device and facilitate the seamless virtual space traversing.

Control circuitry 208 may include communications circuitry suitable for communicating with a server, edge computing systems and devices, a table or database server, or other networks or servers. The instructions for carrying out the above mentioned functionality may be stored on a server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths. In addition, communications circuitry may include circuitry that enables peer-to-peer communication of user equipment devices, or communication of user equipment devices in locations remote from each other (described in more detail below).

Memory may be an electronic storage device that is part of control circuitry 208. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. The storage may be used to store various types of content described herein as well as immersive video application data described above. Nonvolatile memory may also be used (e.g., to launch a boot-up routine and other instructions). Cloud-based storage may also be used to supplement storage 238 of FIG. 2A or instead of storage 222.

Control circuitry 208 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 208 may also include scaler circuitry for up converting and down converting content into the preferred output format of computing device 202. Control circuitry 208 may also include digital-to-analog converter circuitry and analog-to-digital converter circuitry for converting between digital and analog signals. The tuning and encoding circuitry may be used by computing device 202 to receive and to display, to play, or to record content. The tuning and encoding circuitry may also be used to receive video data for seamless interspace traversing. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage is provided as a separate device from computing device 202, the tuning and encoding circuitry (including multiple tuners) may be associated with the storage.

Control circuitry 208 may receive instruction from a user by way of user input interface 264. User input interface 264 may be any suitable user interface, such as a remote control, mouse, trackball, keypad, keyboard, touch screen, touchpad, stylus input, joystick, voice recognition interface, or other user input interfaces (e.g., an interface configured to receive inputs from haptic feedback hand devices 270). Display 210 may be provided as a stand-alone device or integrated with other elements of each one of computing device 202. For example, display 210 may be a touchscreen or touch-sensitive display. In such circumstances, user input interface 264 may be integrated with or combined with display 210 (e.g., where haptic feedback hand devices 270 is configured to enable a user to interact with or manipulate aspects of a media asset interface displayed via head mounted display 262). In some embodiments, user input interface 264 includes a remote-control device having one or more microphones, buttons, keypads, any other components configured to receive user input or combinations thereof. For example, user input interface 264 may include a handheld remote-control device having an alphanumeric keypad and option buttons (e.g., haptic feedback hand devices 270). In a further example, user input interface 264 may include a handheld remote-control device having a microphone and control circuitry configured to receive and identify voice commands and transmit information to media access device 256.

Headset microphone 260 may be integrated with or combined with display 210. Display 210 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 210. Headset microphone 260 may be provided as integrated with other elements of each one of computing device 202 or may be stand-alone units. An audio component of videos and other content displayed on display 210 may be played through speakers (or headphones) of haptic enabled headset 258. In some embodiments, audio may be distributed to a receiver (not shown), which processes and outputs the audio via speakers of haptic enabled headset 258. In some embodiments, for example, control circuitry 208 is configured to provide audio cues to a user, or other audio feedback to a user, using speakers of haptic enabled headset 258. There may be a separate haptic enabled headset 258 or headset microphone 260 may include a microphone configured to receive audio input such as voice commands or speech. For example, a user may speak letters or words that are received by the microphone and converted to text by control circuitry 208. In a further example, a user may voice commands that are received by a microphone and recognized by control circuitry 208. Recording device 268 may be any suitable video camera integrated with the equipment or externally connected. Recording device 268 may be a digital camera comprising a charge-coupled device (CCD) and/or a complementary metal-oxide semiconductor (CMOS) image sensor. Recording device 268 may be an analog camera that converts to digital images via a video card.

The immersive video application may be implemented using any suitable architecture. For example, it may be a stand-alone application wholly implemented on each one of computing device 202. In such an approach, instructions of the application may be stored locally, and data for use by the application is downloaded on a periodic basis (e.g., from an out-of-band feed, from an Internet resource, or using another suitable approach). Control circuitry 208 may retrieve instructions of the application from storage and process the instructions to provide seamless interspace traversing functionality and perform any of the actions discussed herein. Based on the processed instructions, control circuitry 208 may determine what action to perform when input is received from user input interface 264. For example, movement of a cursor on a display up/down may be indicated by the processed instructions when user input interface 264 indicates that an up/down button was selected (e.g., based on inputs provided via haptic feedback hand devices 270). An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the immersive video application is a client/server-based application. Data for use by a thick or thin client implemented on each one of computing device 202 and may be retrieved on-demand by issuing requests to a server remote to each one of computing device 202. For example, the remote server may store the instructions for the application in a storage device. The remote server may process the stored instructions using circuitry (e.g., control circuitry 208) and generate the displays discussed above and below. The client device may receive the displays generated by the remote server and may display the content of the displays locally on computing device 202. This way, the processing of the instructions is performed remotely by the server while the resulting displays (e.g., that may include text, a keyboard, or other visuals) are provided locally on computing device 202. Computing device 202 may receive inputs from the user via input interface 264 and transmit those inputs to the remote server for processing and generating the corresponding displays. For example, computing device 202 may transmit a communication to the remote server indicating that an up/down button was selected via input interface 264 (e.g., based on one or more inputs provided via one or more of haptic feedback hand devices 270 or head mounted display 262). The remote server may process instructions in accordance with that input and generate a display of the application corresponding to the input (e.g., a display that moves a cursor up/down). The generated display is then transmitted to device 800 for presentation to the user.

In some embodiments, the immersive video application may be downloaded and interpreted or otherwise run by an interpreter or virtual machine (run by control circuitry 208). In some embodiments, the immersive video application may be encoded in the ETV Binary Interchange Format (EBIF), received by control circuitry 208 as part of a suitable feed, and interpreted by a user agent running on control circuitry 208. For example, the immersive video application may be an EBIF application. In some embodiments, the immersive video application may be defined by a series of JAVA-based files that are received and run by a local virtual machine or other suitable middleware executed by control circuitry 208. In some of such embodiments (e.g., those employing MPEG-2 or other digital media encoding schemes), immersive video application may be, for example, encoded and transmitted in an MPEG-2 object carousel with the MPEG audio and video packets of a program.

Figure 3:
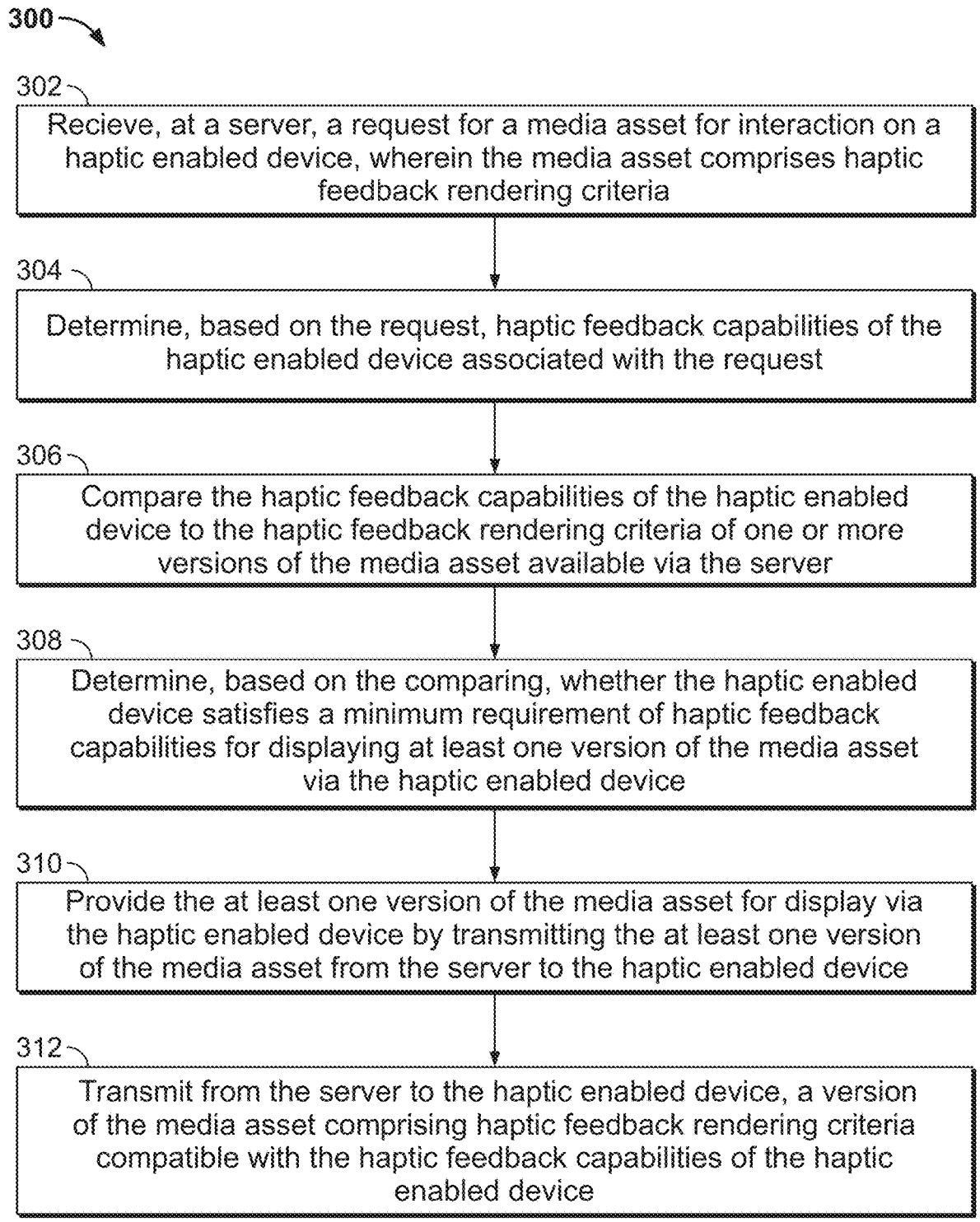
FIG. 3 is a flow chart representing an illustrative process for providing a version of a media asset that is compatible with a haptics enabled device, in accordance with some embodiments of the disclosure.

FIG. 3 is a flow chart representing process 300 for providing a version of a media asset that is compatible with a haptics enabled device, in accordance with some embodiments of the disclosure. Process 300 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

At process block 302, a request for a media asset for interaction on a haptic enabled device is received at a server. The request may be generated based on the scenario described in reference to and shown via FIG. 1. At process block 304, haptic feedback capabilities of the haptic enabled device associated with the request are determined based on the request. For example, the haptic enabled device may be a client device that is communicatively coupled to one or more haptic feedback sensor units (e.g., as shown in FIGS. 1-2B) and the client device may modify the request to include metadata or other descriptive data to optimize a search on the server end based on the device capabilities related to haptic feedback rendering. At process block 306, the haptic feedback capabilities of the haptic enabled device are compared to the haptic feedback rendering criteria of one or more versions of the media asset available via the server. For example, the device may only have a haptic feedback enabled headset coupled to a display. As a result, a version of the media asset that only has rendering criteria for a haptic feedback enabled headset will be searched for. This prevents additional unusable rendering data from being downloaded to the device, which may impact the quality of rendering of the AR or XR experience for the user.

At process block 308, it is determined (e.g., at the server, the client device, or combination thereof), based on the comparing, whether the haptic enabled device satisfies a minimum requirement of the haptic feedback capabilities for display at least one version of the media asset via the haptic enabled device. For example, each stored version of the media asset may have minimum haptic feedback rendering criteria to ensure an appropriate level of immersion for a user (e.g., in addition to requiring a haptic feedback headphone being paired with the client device, a haptic feedback hand device may be required to allow a user to provide inputs to progress through the media asset). The comparison corresponding to the device capabilities and the search for the media asset version is considerable stream lined as the request criteria now limits the number of candidate versions of the media asset, thereby enabling a user to access an appropriate version of the media asset sooner than would be required when transmitting, downloading, and processing data related to unusable or incompatible aspects of a media asset from a client device perspective. At process block 310, the at least one version of the media asset is provided for display (e.g., rendering) via the haptic enabled device by transmitting the at least one version of the media asset from the server to the haptic enabled device. At process block 312, a version of the media asset comprising haptic feedback rendering criteria compatible with the haptic feedback capabilities of the haptic enabled device is transmitted from the server to the haptic enabled device (e.g., as shown in FIG. 1).

Figure 4:
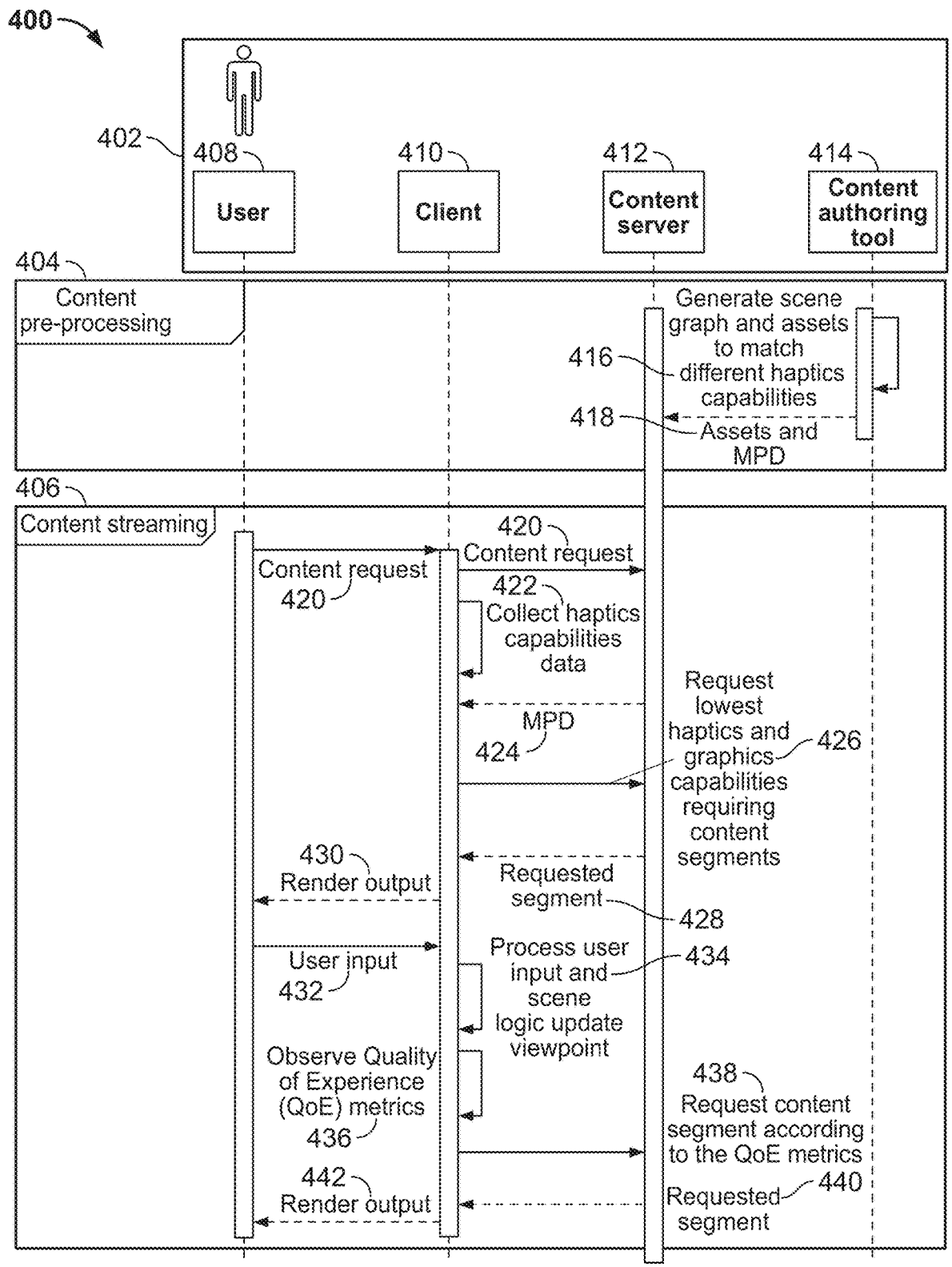
FIG. 4 depicts an illustrative flow chart representing how content pre-processing interfaces with requests for content to stream via a haptics enabled client device, in accordance with some embodiments of the disclosure.

FIG. 4 depicts content processing scenario 400 representing how content pre-processing interfaces with requests for content to stream via a haptics enabled client device, in accordance with some embodiments of the disclosure. Content processing scenario 400 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

Content processing scenario 400 is shown as comprising three layers of activity. As shown in FIG. 4, there is client level 402, content pre-processing level 404, and content streaming level 406. Client level 402 is comprised of user 408, client device 410, content server 412, and content authoring tool 414. User 408 uses client device 410 to communicate with content server 412. Content server 412 is configured to receive various versions of media assets from content authoring tool 414 for distribution to different iterations of client device 410 (e.g., based on requests from user 408). In some embodiments, each of these elements are affiliated with a single content provider. In other embodiments, a plurality of content providers result in a combination of these elements being used to access different versions of media assets, depending on which version, or versions, of the media asset align with one or more parameters of the user request (e.g., the user provides specific haptic feedback settings in their request for the media asset for rendering at client device 410) or the haptic capabilities of client device 410. For example, multiple versions of the media asset may be available with similar or related haptic feedback settings from multiple content providers (e.g., as sourced from different iterations of content authoring tool 414). Depending on whether the user has a profile corresponding to a particular content provider's media assets or client device 410 include device settings (e.g., display or haptic feedback resolution) corresponding to a particular version of a media asset, one of the multiple versions may be selected with priority for transmission to client device 410 based on one or more of these parameters.

Content pre-processing level 404 corresponds to device and network activity that occurs in response to user 408 creating a request for a haptic feedback enabled media asset via client device 410 from content server 412 (e.g., user 408 conducts a search for a media asset using a device configured to provide haptic feedback while rendering the requested media asset for user interaction). In some embodiments, content pre-processing level 404 may occur prior to user 408 creating the request. For example, content authoring tool 414 may be used to generate a number of assets with MPDs for storage on content server 412 so as to reduce processing required in response to a user request. In other embodiments, content authoring tool 414 may be configured to generate assets with MPDs for storage and transmission to client device 410 based on the request. For example, user 408 may request a version of the asset that includes some haptic feedback, but no other haptic criteria, for rendering (e.g., a portion of a haptic feedback device or system affiliated with user 408 has a non-functioning haptic feedback aspect). In response to this tailored request, content authoring tool 414 may identify a version of the media asset from the request with at least the explicitly requested haptic feedback criteria for rendering and then may generate a version of the media asset for transmitting to content server 412 for transmission to client device 410, where the modified version of the media asset is rendered for interaction and display for consumption by user 408. In any of the above scenarios, content pre-processing level 414 comprises content generation 416 via content authoring tool 414 which leads to transmission 418 to content server 412 over a hard connection or a wireless connection from content authoring tool 414 of media assets (or versions thereof) and corresponding MPDs for review at one or more of content server 412 or content device 410.

In some embodiments, content pre-processing level 404 corresponds to XR content being generated for distribution using a streaming approach where the content is created by a content author with typical content authoring tools. Typical content authoring tools include, for example, 3D animation and modelling software, image editing software, or combinations thereof, that are used for creating the 3D assets which are then imported to a real-time 3D scene editor. In real-time 3D scene editor, content author builds the XR experience by combining imported 3D assets, audio files, material definitions, or combinations thereof. A content author may also define the rules of interaction of elements and user input controls that form the logic of the interactive experience. For 3D graphics assets, content author creates different level-of-detail (hereinafter "LoD") versions of each asset either by modelling them by hand, or by using some automatic LoD creation tool. A LoD creation tool can also be part of the real-time 3D scene editor, which produces LoD versions as needed when the authored experience is exported to a format that can be used for run-time streaming to the viewing clients. Similar to the 3D asset LoD versions, the content author, or the authoring tool, may also produce different versions of the data needed for the haptics rendering.

Different haptics rendering data versions enable haptics rendering with different fidelity levels and with different types of haptics feedback devices with different approaches for generating the haptics feedback. The content author, or the content authoring tool, also preferably links correct versions of the graphics 3D assets with the correct haptics rendering data versions in order to enable the viewing client to know which 3D asset version matches which haptics rendering data asset version. When the content author has done the scene construction by assembling the scene from the 3D assets and defined the logic used by the experience, the real-time 3D scene editor can export the experience to the run-time format. In the run-time format, the data needed for distributing the experience is packaged so that it can be uploaded to the server and the server can distribute the data as a package or by streaming individual elements of it to the clients. In the case of XR experiences, run-time data includes one or more of different versions of the graphics, corresponding audio, corresponding haptics, the media asset, the scene graph describing the scene structure, or associated logic. In case of streaming approach, run-time data will need to include MPD that defines how the client can adapt the content to the haptics capabilities of the client device.

Content streaming level 406 corresponds to a series of steps and responses to inputs between user 408, client device 410, and content server 412 which results in client device 410 being used to render a media asset from a request generated by user 408 based on a version of the media asset transmitted from content server 412. User 408 generates content request 420 (e.g., through an interface available via client device 410). Content request 420 is transmitted from client device 410 to content server 412. Simultaneously, or shortly thereafter, client device 410 retrieves or collects haptics capabilities data via device configuration retrieval 422, which is then compared to one or more of MPD 424 related to the media asset that is the subject of the request. MPD 424 may be provided from content server 412 to client device 410 or may be used by content server 412 to perform a search for a version of the media asset with an iteration of MPD 424 that aligns with data available via device configuration retrieval 422. As shown in FIG. 4, based on a comparison of device data related to client device 410 from device configuration retrieval 422 to MPD 424, client device 410 transmits a modified, or more specified request, for a different media asset version corresponding to a version of MPD 424 which aligns with capabilities request 426 (e.g., client device 410 is determined to only be able to render or process a lowest haptics and graphics version of the media asset based one or more of a network strength between client device 410 and content server 412 or the device information corresponding to haptics and graphics rendering abilities of client device 410).

Once a viable version of MPD 424 is identified, corresponding to a version of the requested media asset that is available via content server 412, one or more segments of the media asset are requested from content server 412 and transmitted. This is shown by requested segment 428. Requested segment 428 may be based on one or more of a network strength of a communication channel between client device 410 and content server 412, a progress point of user 408 through the media asset, or an express request from user 408 for a specific portion of the media asset, resulting in content server 412 transmitting requested segment 428. Once requested segment 428 is received at client device 410, client device 410 proceeds to render the requested segment via rendered output 430 such that user 408 can perceive or interact with the requested segment of the media asset. Once user 408 activates the request segment for rendering (e.g., by starting an AR or XR experience, or playing the requested segment of the media asset), user 408 provides user input 432. User input 432 corresponds to user 408 providing haptic inputs, or combinations of various interface inputs with haptic inputs, to client device in order to progress through the media asset and interact with various aspects of rendered output 430. Processing 434 then occurs where user input 432 and a current progress point through the media asset is analyzed (e.g., to determine if there are aspects of the media asset to put in focus such as a foreground object as opposed to a background setting in view of user input 432, which may be a focusing of the user's eyes on a particular rendered object within the media asset at the current progress point).

As part of this processing, or in the alternative or in combination, observation of experience metrics 436 occurs. The experience metrics reviewed correspond to Quality of Experience (hereinafter "QoE") metrics, which may correspond to measurable indications of how well the media asset is experienced by the user in view of one or more of availability of the media asset (e.g., a correct version or a useable version for a given client device), bitrate corresponding to quality of visually rendered elements (e.g., video), playback errors (e.g., resulting in issues with playback interfering with a user's progress through a media asset), rebuffering (e.g., unplanned, unexpected, or unwanted pausing of media asset playback caused by inconsistent or erroneous downloading of one or more segments), startup time (e.g., a length of time from the user request for a media asset for rendering via a haptics enabled client device to when the user may interact uninterrupted with the media asset via the haptics enabled client device), or video start failure (e.g., one or more of how many times the user fails to start interacting with a requested media asset before a single segment is rendered for user interaction or the user sees nothing at all as they repeatedly press the play button to start interacting with the media asset). Based on the user's issues with a current segment, request for content 438 is generated, where request for content 438 corresponds to a request from client device 410 to content server 412 to improve one or more QoE metrics described above and enabling user 408 to proceed with interacting with one or more segments of the requested media asset. Transmission 440 corresponds to a response of content server 412 to request for content 438 and includes at least one segment of the media asset to be rendered via client device 410 for user interaction during segment rendering 442.

Figure 5A:
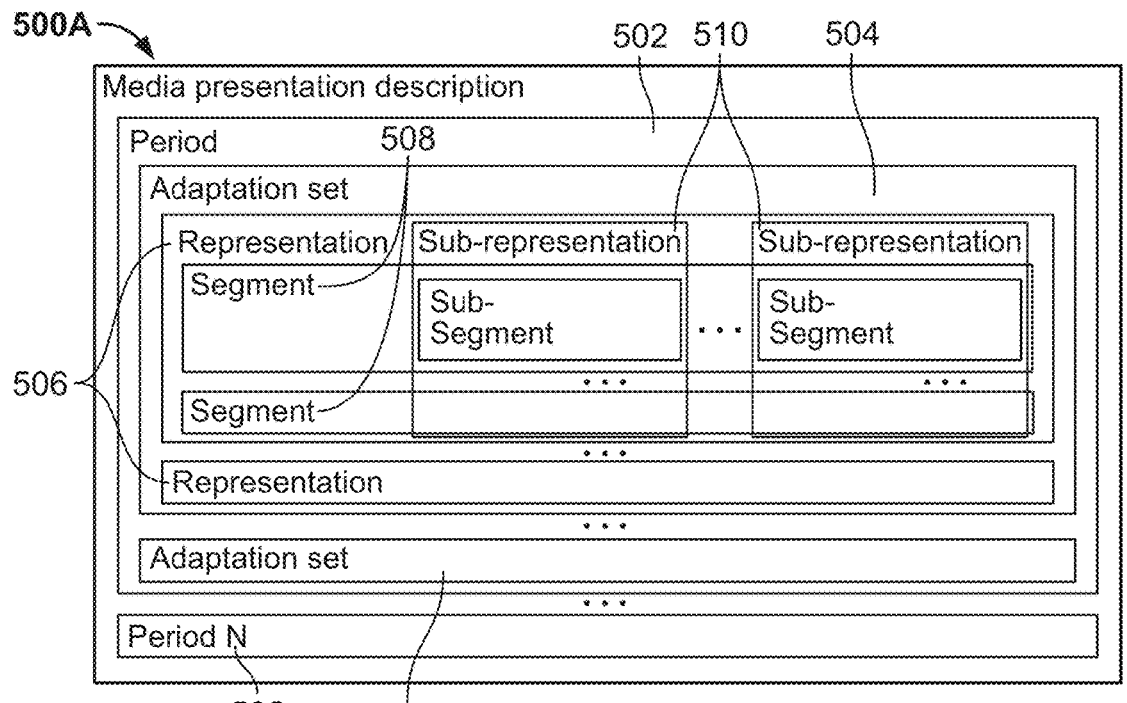
FIG. 5A is an exemplary media presentation description for a media asset without haptic feedback rendering criteria, in accordance with some embodiments of the disclosure.
Figure 5B:
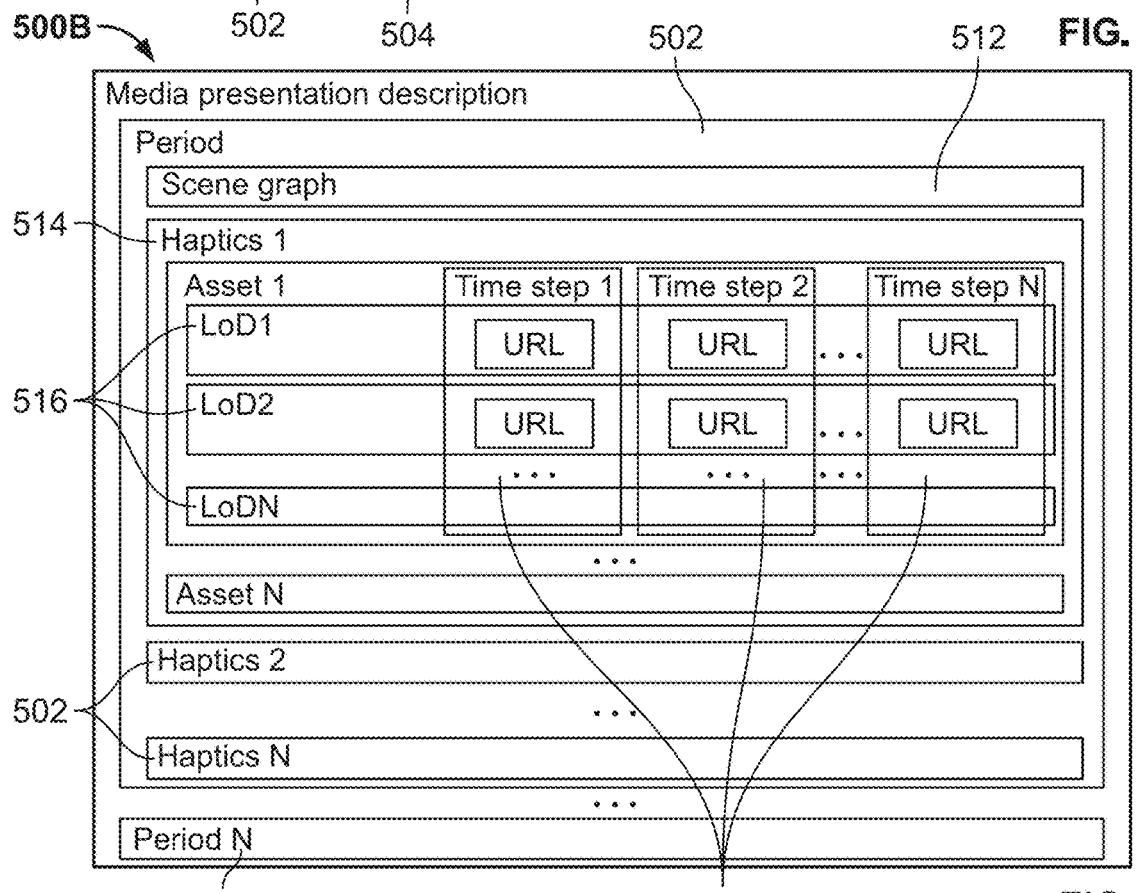
FIG. 5B is an exemplary media presentation description for a media asset with haptic feedback rendering criteria, in accordance with some embodiments of the disclosure.

FIG. 5A depicts non-haptics media presentation description 500A for a media asset without haptic feedback rendering criteria, in accordance with some embodiments of the disclosure. This disclosure includes the use of a general data structure of the MPEG-DASH MPD illustrated in FIG. 5A, with some additional information not shown in FIG. 5A and depicted in FIG. 5B. In this solution, metadata used by the client to perform adaptation is organized to comply with the MPEG-DASH MPD as illustrated in FIG. 5B. Changes to the MPD of FIG. 5A, which are depicted in FIG. 5B, enable one or more of the processes described herein to be executed by one or more of the system, devices, or combinations thereof, described herein.

Non-Haptics media presentation description 500A is comprised of data arranged in a structure navigable via one or more systems or devices described herein. As shown in FIG. 5A, a primary entity is period 502. There may be N periods (e.g., a plurality of periods), as shown in FIGS. 5A and 5B. Each period provides information corresponding to a single consistent virtual scene composited of 3D assets. A single scene is, for example, a single virtual environment where some interactive or pre-defined virtual experience takes place. Virtual experience can consist of several scenes each defined in individual period block, similar to how a movie consists of several scenes. Each of period 502 is comprised of a respective adaptation set 504, corresponding to representations 506. Representations 506 correspond to data structures defining different aspects of a media asset with rendering protocols corresponding to a particular device capabilities, for example. Representations 506 comprise one or more of segments 508, which may, for example, be individual scenes, as described above, or different elements of a scene (e.g., definition of different aspects, objects in a foreground, objects defining a background, or combinations thereof). In some embodiments, segments 508 correspond to sub-representations 510, each of which correspond to different rendering criteria of segments 508 based on one or more of user settings or client device settings with respect to generation of the media asset defined by non-haptics media presentation description 500A.

FIG. 5B depicts haptics media presentation description 500B for a media asset with haptic feedback rendering criteria, in accordance with some embodiments of the disclosure. In the MPD structure used by the various devices and systems of this disclosure to execute one or more of the processes described herein, the main hierarchical entity remains period 502, as described in reference to FIG. 5A. As described above, there may be a plurality of periods 502 (e.g., N periods). For the MPD of FIG. 5B, each of periods 502 are comprised of a respective scene graph 512, followed by a several blocks containing haptics adaptation sets 514. The number of haptics adaptation sets 514 will depend on a version of the media asset stored on a content server and the MPD will define which haptic enabled devices may render the described media asset version for user consumption and interaction. As described in reference to FIG. 5A, each period provides information corresponding to a single consistent virtual scene composited of 3D assets, and the MPD of FIG. 5B includes a respective iteration of scene graph 512, which collectively define the versions of content assets that are suitable for the specific haptics feedback type, including data structures indicative of which aspects of a particular representation or scene are required for an optimum user experience with a haptic enabled version of the media asset (e.g., where a foreground in one part of a media asset is considered more important than a background, or vice versa, as characterized at least in part by one or more of scene graphs 512). Within each of haptics adaptations sets 514, the data comprising the version of the media asset suitable for the specific haptic adaptation are defined, including variations in levels of details 516 (hereinafter "LoD") for a particular version of a requested media asset as well as temporal sequence steps 518 for assets requiring progression of a user through preceding aspects of the media asset before progressing through a different segment of the media asset. Examples of LoDs 516 include one or more of graphics types, mesh files (e.g., 3D mesh rendering files), haptics simulation mass spring models, area feedback, rigid-deformable feedback, rigid-rigid feedback, tactile feedback, collision volume of different time steps, 3D collision volume, single point feedback, or shape matching. Each of temporal sequence steps 518 may include one or more Uniform Resource Locators (hereinafter "URLs") for particular files corresponding to different aspects of details (e.g., different iterations of LoDs 516) of a segment to be rendered for user consumption or interaction at a client device.

Figure 6:
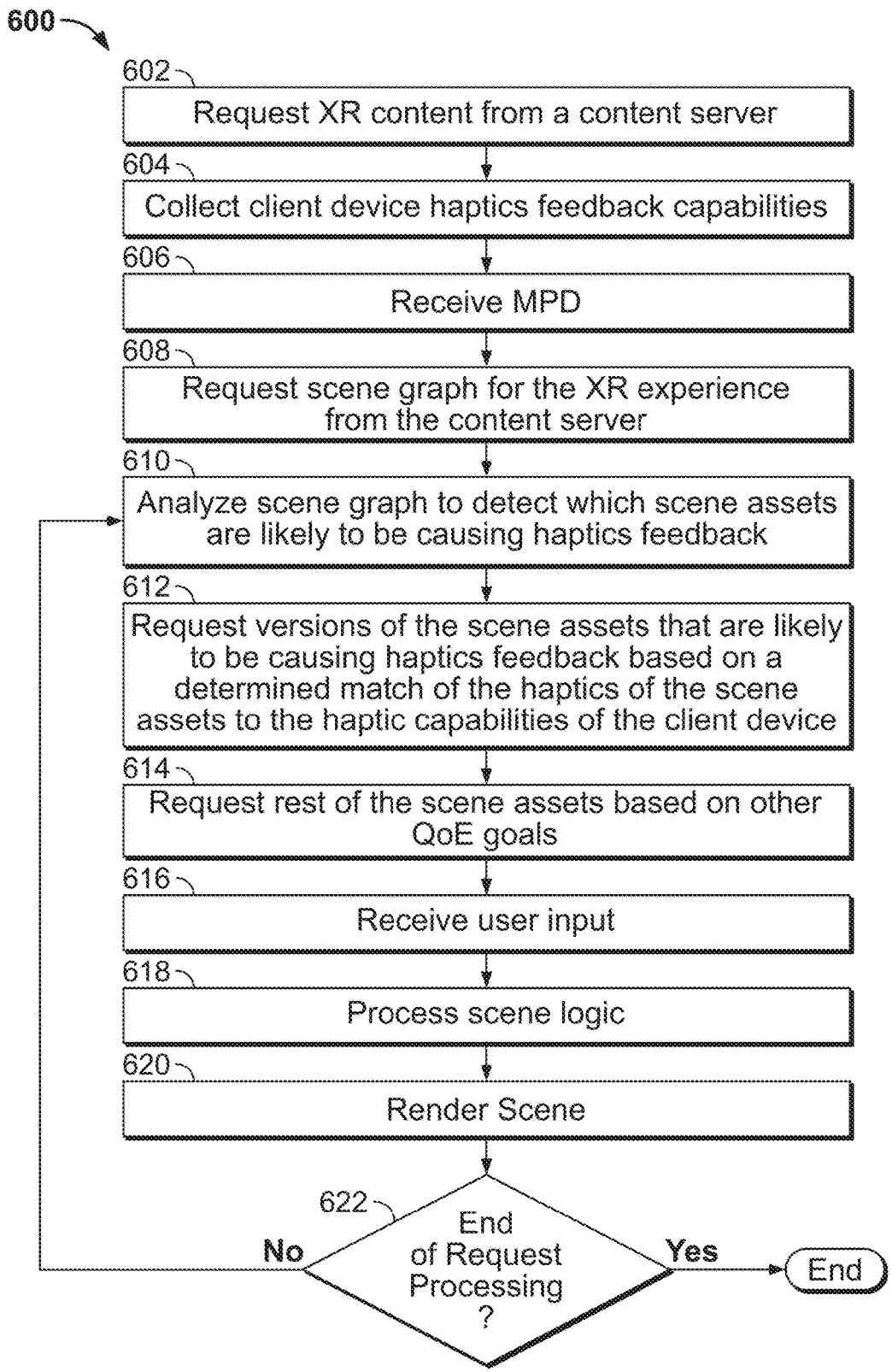
FIG. 6 is a flow chart representing an illustrative process for rendering a media asset based on haptic capabilities of a haptic enabled client device, in accordance with some embodiments of the disclosure.

FIG. 6 is a flow chart representing process 600 for rendering a media asset based on haptic capabilities of a haptic enabled client device, in accordance with some embodiments of the disclosure. Process 600 may be executed by processing circuitry on a client user device, may be executed at a server (e.g., a server for media content distribution), or combinations thereof (e.g., any of the systems and devices described herein). In some embodiments, process 600 may be executed by a viewing client and process 600 may start when a user launches an application implementing the viewing client (e.g., opens or starts an interface corresponding to a content distributor server). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

When a user starts the application, the user also defines the content to be viewed (e.g., based on one or more of a user input or device rendering capabilities associated with the generation of the request). Content corresponding to the request (e.g., different versions of a media asset, where the versions are at least partially defined by haptic feedback requirements) may be accessible by an interactive link which, when selected, causes a download of a package or the MPD residing on the content server. The link to the MPD can be a normal URL identifying the content server and specific content. A viewing client application is launched either by explicit command by the user or automatically by the operating system based on identifying content type request and application associated with the specific content type. In addition to being a stand-alone application, a viewing client can be integrated with a web browser or a social media client or it can be part of the operating system.

At process block 602, XR content is requested from a content server. At process block 604, client device haptics feedback capabilities are collected at 604. At process block 606, a MPD corresponding to the request for CR content is received. At process block 608, a scene graph for the XR experience from the content server is requested. At process block 610, the scene graph is analyzed to detect which scene assets are likely to be causing haptics feedback. At process block 612, versions of the scene assets are requested. Each version is likely to be causing haptics feedback based on a determined match of the haptics of the scene assets to the haptic capabilities of the client device. At process block 614, the rest of the scene assets, or remaining scene assets, are requested based on other QoE goals. At process block 616, one or more user inputs are received. At process block 618, scene logic is processed. At process block 620, the scene corresponding to the requested versions is rendered. At decision block 622, a determination is made regarding the end of processing corresponding to the request. This decision could be made by one or more processing units or circuitry based on one or more of network strength, device capabilities, user activity, user settings, or combinations thereof (e.g., the user exited out of the media asset rendering application). If it is determined that request processing has not ended (NO at 622) such that one or more scene assets or media asset segments are to be requested and processed for rendering at a client device, then process block 610 is revisited until the scene can be rendered according to newly requested assets. If it is determined that request processing has ended (YES at 622), then process 600 ends.

Further regarding process 600, as the viewing client requests MPD from the content server, the viewing client also collects information about haptics capabilities of the client device. Haptics capabilities define the performance limitations of the haptics feedback devices embedded or attached to the client device. Haptics capabilities are requested once at the beginning of the session, as the capabilities should not change over time. When the viewing client has received the MPD, it selects which scene of the XR experience it will execute first. The selection of the first scene can take place based on the logic defined by the content author, selection done by the user or some other contextual cue. The viewing client requests the scene graph of the first scene to be executed from the content server.

A scene graph describes the layout and the logic of the scene. Scene graph also defines the logic of the user input processing, thus enabling interactive XR experiences. Based on the scene graph, the viewing client can estimate what are the elements of the scene that may cause haptic feedback to be generated for the user. The scene graph may also provide links (e.g., URLs) to the scene assets of which the scene consists of. The corresponding MPD may further define different versions of the assets available for the viewing client to download. When the viewing client has defined what scene elements need to be adapted to the haptics feedback capabilities of the client device, it proceeds to download individual scene assets from content server. For the scene elements the viewing client has identified as being used for haptic feedback generation, the viewing client selects to download the assets versions that match the haptics feedback capabilities of the client device. MPD defines how different versions of the assets available match with the haptics feedback capabilities. Haptics data is downloaded in format that is suitable for the client device haptics feedback capabilities and versions of the graphics, audio etc. assets linked with that scene element are then downloaded so that they match the haptics data version. For other scene assets that are not used for haptics feedback generation, the viewing client proceeds to download versions that match other possible adaptation rules, such as a LoD based on distance, client device rendering capabilities or data transmission bandwidth, or combinations thereof.

When the viewing client has received scene assets required by the scene, it assembles the scene based on the scene graph and starts the XR experience execution. When the XR experience is executed, the viewing client proceeds to receive user input, process scene logic based on the dynamic actions taking place in the scene and user input, and then renders the scene updated based on the scene logic and input processing. When the scene has been rendered to the user, the XR experience update loop continues to execute by returning to the processing step where the viewing client analyzes the scene in order to determine if in the updated scene state, new scene elements have become part of the elements that are generating haptics feedback, or if some elements previously being used for generating the haptics feedback are no longer part of the haptics rendering. New elements that may cause haptics feedback, or asset versions matching the haptics capabilities of the client device, will be requested from the server. For the elements that are no longer capable of causing haptics feedback, new versions of the assets based on other adaptation goals besides haptics feedback capabilities may be requested by the viewing client from the content server. The viewing client receives the requested asset versions from the content server, replaces old versions of the asset with the ones received, and then performs the rest of the update loop continuously until the end of scene processing is requested by the user, content logic, operating system, or combinations thereof.

Figure 7:
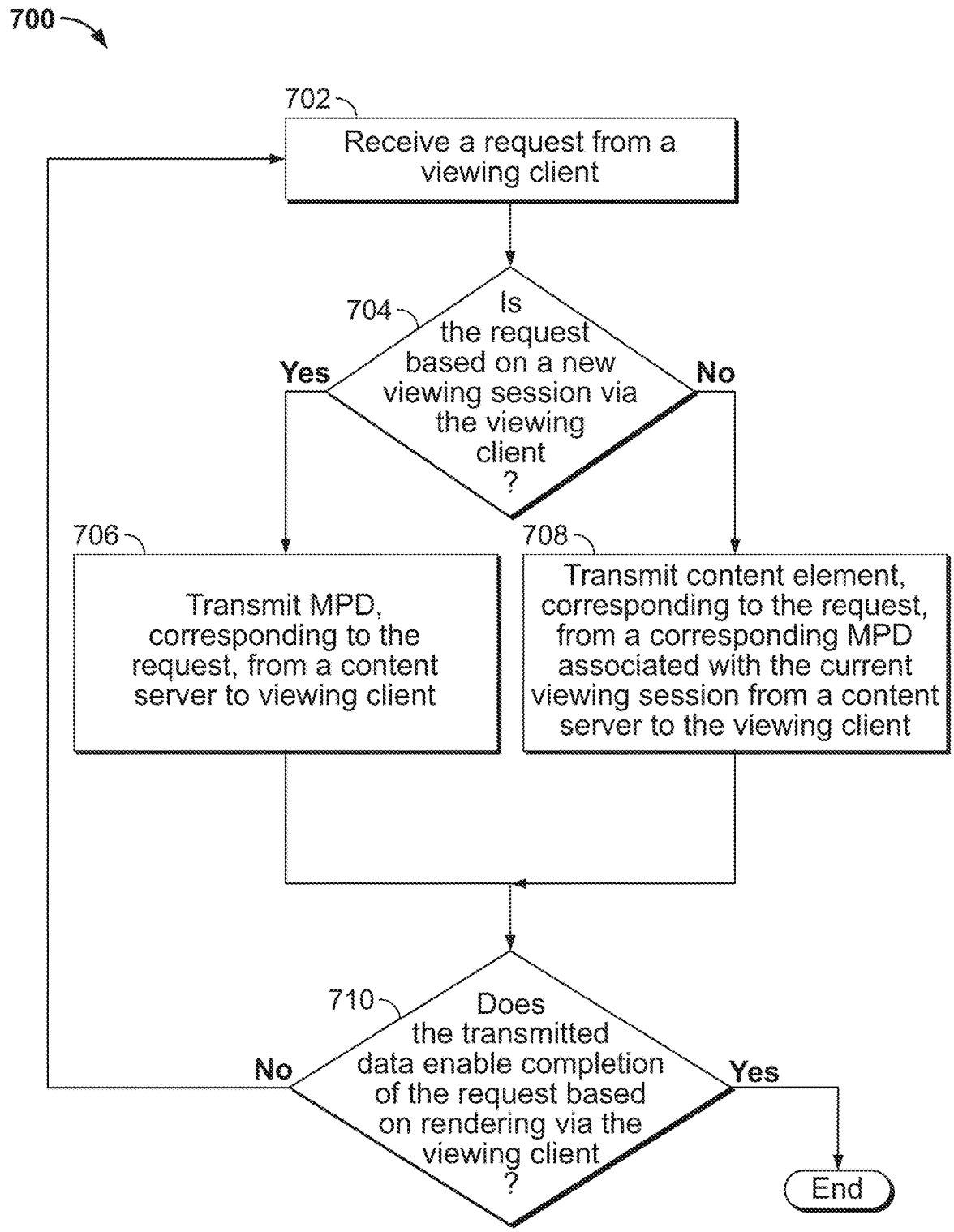
FIG. 7 is a flow chart representing an illustrative process for processing a request for a media asset, in accordance with some embodiments of the disclosure.

FIG. 7 is a flow chart representing process 700 for processing a request for a media asset, in accordance with some embodiments of the disclosure. Process 700 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

As previously described herein, a content server stores the XR experience data to be distributed along with the MPD for the data stored in the MPD structure. In the run-time processing, the content server distributes data based on client requests in a client pull model, as illustrated in FIG. 5B. At the beginning of a new data streaming session, the viewing client first requests an MPD and then based on the MPD, the viewing client starts to request XR experience assets according to the MPD and viewing client scene analysis, as described in the previous chapter.

At process block 702, a request is received from a viewing client (e.g., at a content server or through a user interface for a content distributor). The request may include a request to start a new media asset or may be a request for a different version of a media asset (e.g., a lower resolution version of portions of a scene in a media asset), depending on a user contribution to the request (e.g., a user of a client device who has a personal profile) and a device contribution to the request (e.g., a wireless connection between the client device and a content server is reduced in strength from a time a media asset was originally requested). At decision block 704, the request is processed to determine if the request results from a new viewing session started via a viewing client from which the request originated. If it is determined that the request is based on a new viewing session (YES at 704), a MPD (e.g., a MPD for an entire media asset) corresponding to the request is transmitted from a content server to the viewing client at process block 706. If it is determined that the request is not based on a new viewing session (NO at 704), a content element (e.g., a substructure of a MPD data structure corresponding to a particular scene or element of a media asset such as rendering criteria for a particular object or interactive environment based on a user progress through a currently being used media asset), corresponding to the request, is transmitted from a corresponding MPD associated with the current viewing session from a content server to the viewing client at process block 708. For example, a QoE score may decrease during a viewing session leading to rendering problems at the viewing client. As a result, a different or less data heavy version of a particular content element of the media asset may be transmitted to improve the QoE score for the remainder of the current viewing session. At decision block 710, a determination is made regarding whether the transmitted data (e.g., data transmitted during execution of either process block 706 or 708) enables completion of the request based on rendering via the viewing client. For example, it may be determined that the request is completed if the user of the viewing client continues a current viewing session, decides to commence the new viewing session, or the QoE score has increased since rendering commenced after reception by the viewing client of the updated data. If it is determined the transmitted data failed to enable completion of the request (NO at 710), process block 702 is revisited as the parameters of the request have not been adequately satisfied based on the transmitted and rendered data at the viewing client. For example, the user does not start viewing the media asset due to continued loading or the media asset fails to commence in response to a user input to start the media. Therefore, additional or alternative data is needed to be transmitted to the viewing client for execution of the request. If it is determined that transmitted data did enable completion of the request (YES at 710), then process 700 ends as the user has successfully received and interacted with a media asset and the rendering resulted in a satisfactory QoE score.

Figure 8:
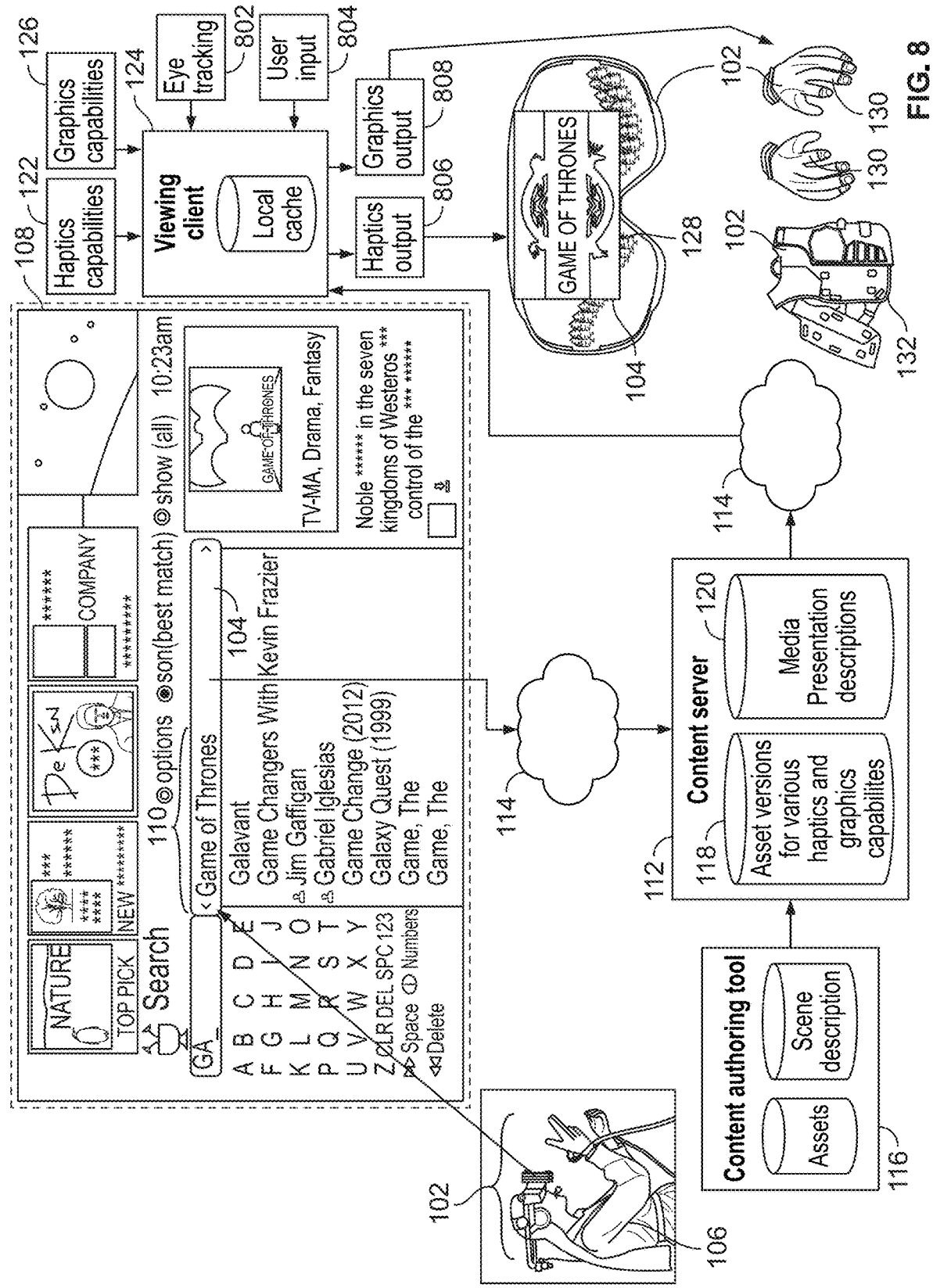
FIG. 8 illustrates a media asset rendering scenario based on a comparison of rendering criteria of a media asset to user and device sourced media asset rendering settings, in accordance with some embodiments of the disclosure.

FIG. 8 illustrates media asset rendering scenario 800 where client device 102 is used to request a version of media asset 104 that has haptics feedback supportable by client device 102 while also consider user generated parameters as well as operating parameters of client device 102 at the time of the request of media asset 104, in accordance with some embodiments of the disclosure. Media asset rendering scenario 800 may incorporate or be incorporated into any or all of the elements depicted in one or more of FIGS. 1-7 and 9-19. Media asset rendering scenario 800 may be executed, in whole or in part, by one or more components of the devices of FIGS. 2A and 2B, and may be executed using one or more steps of the methods depicted via FIG. 3, 4, 6, 7, 9, 12, 13, 18 or 19.

Media asset rendering scenario 800 shows user 106 interacting with media platform 108 using client device 102. Client device 102 is a haptic feedback enabled device (e.g., a haptics enabled device configured to provide haptic feedback to user 106 based on haptic responses provided as part of media asset 104. User 106 is shown requesting a version of media asset 104 via client device 102. The request may be a voice to text input, a text input based on a keyboard input, a text input based on eye movement tracking enabled by a head mounted aspect of client device 102, a selection of a media asset icon on a user interface, or combinations thereof. As shown in FIG. 8, user 106 has provided text string 110 to the shown user interface of media platform 108 to perform a search based on text string 110 to identify media asset 104. Media platform 108 receives the request at content server 112 through wireless network 114. Content server 112 is configured to receive media assets and multiple versions thereof from content authoring tool 116. Content authoring tool 116 may be independent from media platform 108, may be sourced by media platform 108, or some combination thereof, in order to provide access to user 106 to different versions of media asset 104 via content server 112.

Content server 112 receives the user request based on information transmitted from client device 102 through wireless network 114 to content server 112 in order to identify a version of media asset 104 available via content server 112 to transmit through wireless network 114 for rendering at client device 102. As shown in FIG. 8, content server 112 is configured to store media asset versions 118 and corresponding media presentation descriptions (MPDs) 120. Each of MPDs 120 provide information related to haptics capabilities enabled by each of media asset versions 118. For example, a first version of media asset versions 118 may result in a version of media asset 104 being transmitted to client device 102 that enables haptic feedback via hand sensors of client device 102 while a second version of media asset versions 118 may result in a version of media asset 104 being transmitted to client device 102 that lacks any haptic feedback enablement during rendering of media asset 104. The selection or determination at content server 112 of which version of media asset 104 to transmit to client device 102 is based at least in part on haptic feedback settings 122 as stored on or accessible via viewing client 124.

Viewing client 124 corresponds to one or more processing units of client device 102 that enables a local cache (e.g., a portion of memory of client device 102) to be used to receive transmitted portions of media asset 104 from content server 112 through wireless network 114 such that haptics capabilities 122 and device settings 126 can be compared to MPD 120 of media asset 104. Haptics capabilities 122 include a list of haptic feedback options that can be rendered by client device 102 for perception by user 106. For example, if user 106 only uses head mounted display 128, then content server 112 will identify and transmit one of media asset versions 118 with MPD 120 corresponding to haptic feedback rendering by head mounted display 128. In another example, if user 106 uses head mounted display 128 and pairs haptic hand sensors 130 to have client device 102 capable of rendering haptic feedback based on these two device, then client server 112 will transmit one of media asset versions 118 with MPD 120 corresponding to haptic feedback rendering by both head mounted display 128 and haptic hand sensors 130. In some embodiments, client device 102 transmits data related to device settings 126 and haptics capabilities 122 to content server 112 for identifying which of media asset versions to identify for transmission to viewing client 124 of client device 102 based at least in part on a comparison of one or more of device settings 126 or haptics capabilities 122 to one or more of MPDs 120 in order to identify a proper version of media asset 104 to transmit. In some embodiments, client device 102 further comprises haptic vest 132, which is configured to generate haptic feedback around the torso of user 106. Haptic vest 132 is communicatively coupled and synchronized with head mounted display 128 and haptic hand sensors 130 to provide an immersive experience of media asset 104 for user 106.

As shown in FIG. 8, viewing client 124 is configured to receive eye tracking data 802 and user input 804 in order to provide graphics output 806 and haptics output 808 to client device 102. Eye tracking data 802 corresponds to user-sourced data based on a recordation of the user's eye movements relative to, for example, head mounted display 128. In some embodiments, head mounted display 128 is configured to receive and track a user's eye movements relative to a screen in order to modify aspects of the display (e.g., receive an indication that a user selected something for modification or for interaction) and may also be used to track a user's level of activity (e.g., if the user's eye movements are affiliated with fatigue, this may lead to a reduction in the resolution or brightness of the graphics output rendered on a display to avoid straining the user's eye to a point where the user stops interfacing with the requested media asset). User input 804 may also correspond to eye tracking data 802 or may be a separate input, such as on entered via haptic hand sensors 130. User input 804 may further comprise device settings of client device 102 such that graphics, network, or other rendering controls are pre-set based on a particular user's preferences. Each media asset available to viewing client 124 via content server 112 has a respective MPD 120 which outlines for viewing client 124 the contents to be rendered for graphics output 806 and haptics output 808. In some embodiments, haptics output 808 will correspond to a version of MPD 120 that includes haptic feedback output elements based on the haptic capabilities of client device 102. For example, as shown in FIG. 8, MPD 120 of the requested media asset would include haptics output criteria via haptics output 808 for each element of client device 102, which includes head mounted display 128, haptic hand sensors 103, and haptic vest 132. In some embodiments, haptics output 808 may be modified based on one or more of eye tracking data 802 or user input 804 such that a QoE score is maintained at an acceptable level or increases to an acceptable level (e.g., where the QoE score was considered below an acceptable value based on one or more factors described in reference to QoE scores in this disclosure, including direct feedback or inputs from the user such as eye tracking data 802 or user input 804).

Figure 9:
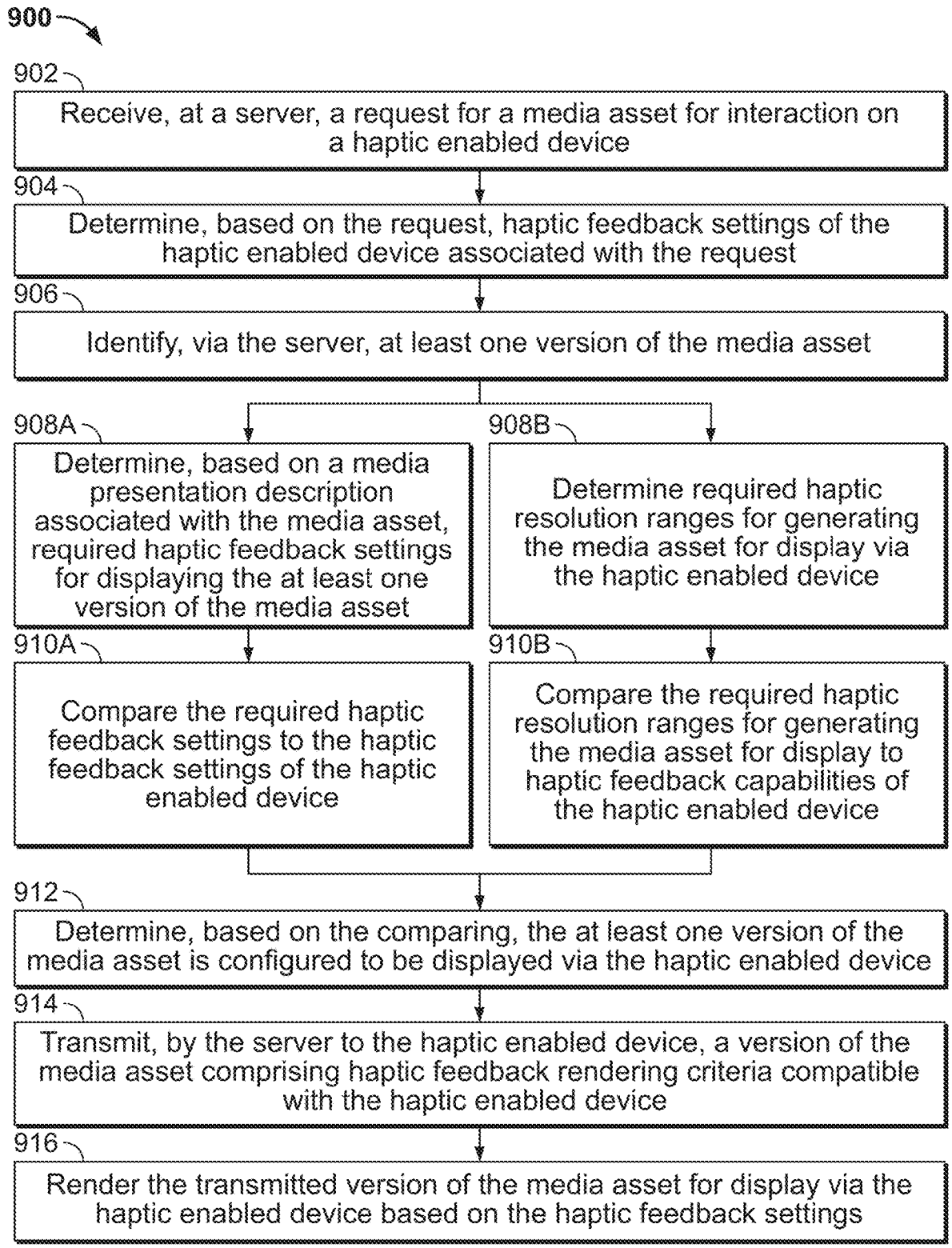
FIG. 9 is a flow chart representing an illustrative process for rendering a version of a media asset at a haptic enabled client device based on haptic feedback settings of the haptic enabled client device, in accordance with some embodiments of the disclosure.

FIG. 9 is a flow chart representing process 900 for rendering a version of a media asset at a haptic enabled client device based on haptic feedback settings of the haptic enabled client device, in accordance with some embodiments of the disclosure. Process 900 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

At process block 902, a request is received at a server for a media asset for interaction on a haptic enabled device. At process block 904, haptic feedback settings of the haptic enabled device associated with the request are determined. At process block 906, at least one version of the media asset is identified via the server. Once the at least one version of the requested media asset is identified, process blocks 908A and 908B (as well as 910A and 910B) may be configured to be processed simultaneously, or one after the other, depending on one or more of computing capabilities of a device configured to execute process 900 or a network strength between the sever and the device from which the request originated. At process block 908A, required haptic feedback settings for displaying the at least one version of the media asset are determined based on a media presentation description (e.g., the MPDs described in the disclosure) associated with the media asset. For example, versions of the media asset may be produced with the intent to achieve particular QoE scores and versions that are incompatible with particular client devices or client device configurations may not be made available via the server based on the required haptic feedback settings for a particular version of the media asset. At process block 910A, the required haptic feedback settings are compared to the haptic feedback settings of the haptic enabled device. Similarly, at process block 908B, the required haptic resolution ranges for generating the media asset for display via the haptic enabled device are determined. For example, a similar QoE analysis may be performed as was described in reference to process block 908A. At process block 910B, the required haptic resolution ranges for generating the media asset for display are compared to the haptic feedback capabilities of the haptic enabled device.

As a clarifying example, haptic feedback resolution ranges may be set in a manner similar to display resolution ranges. As with creating and displaying videos, certain devices are incapable of rendering the higher resolution data when the device is not configured to display these resolution ranges of the video, particularly when the video is created using a higher resolution video generation apparatus. Referring back to the QoE analysis, if a device is incapable of providing a desired haptic feedback range to a user as defined in a MPD of a version of a media asset, then a different version of the media asset without the haptic feedback rendering criteria or a version with lower haptic feedback range may be selected.

At process block 912, the at least one version of the media asset is determined, based on one or more of the comparison performed via process blocks 910A or 910B, to be configured to be displayed via the haptic enabled device. At process block 914, a version of the media asset comprising haptic feedback rendering criteria compatible with the haptic enable device is transmitted by the server to the haptic enabled device. At process block 916, the transmitted version of the media asset is rendered for display via the haptic enabled device based on the haptic feedback settings. For example, the settings from the MPD may be modified based on user input or user stored settings at the haptic enabled device. In some embodiments, this may be modified with a goal of maintaining a minimum or target QoE score while the user who is the source of the request is interaction with the rendered media asset.

Figure 10:
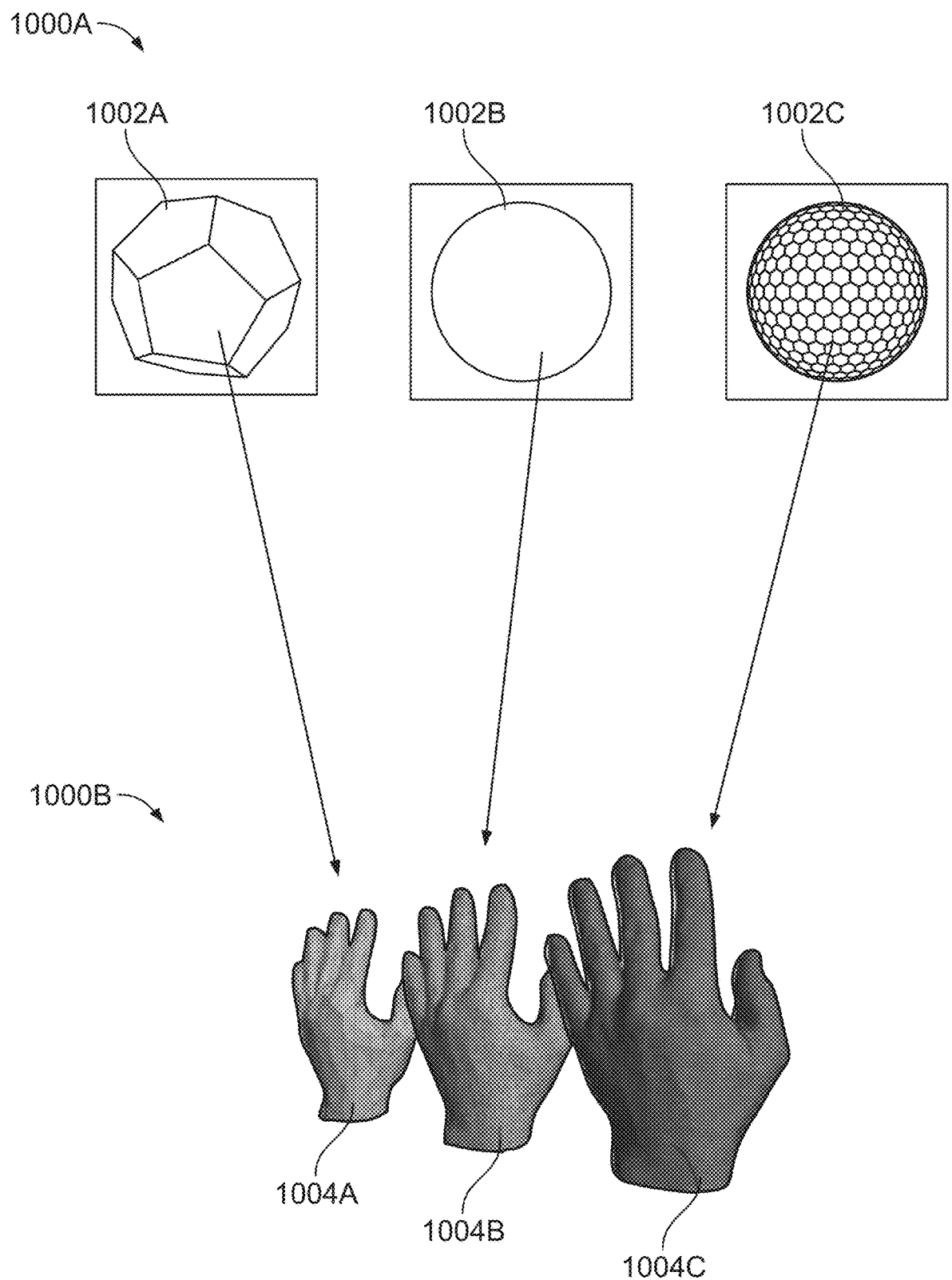
FIG. 10 depicts examples of haptics fidelity levels as each level relates to haptic feedback experienced by a user of a haptics enabled client device, in accordance with some embodiments of the disclosure.

FIG. 10 depicts haptic fidelity levels 1000A, which show examples of a same object with different haptic fidelity levels, and haptic feedback response levels 1000B, which correspond to what a user would experience from a haptic response resolution level examples of haptics fidelity levels as each level relates to haptic feedback experienced by a user of a haptics enabled client device, in accordance with some embodiments of the disclosure. Haptic fidelity levels 1000A may be determined or used as a standard for rendering one or more elements of a media asset based on one or more factors discussed in this disclosure (e.g., wireless network strength, MPD files of versions of a media asset, QoE scores, client device haptic capabilities, user settings associated with a client device, or combinations thereof). Haptic feedback response levels 1000B correspond to illustrative examples of haptic feedback levels a user may experience where a haptic feedback handheld device is incorporated into the client device used to render the media asset. The aspects of FIG. 10 may be generated as part of rendering of a media asset via any of the devices described herein while executing one or more of the processes described herein.

As described previously in this disclosure, XR content may be created by a content author with content authoring tools. Content authoring tools include, for example, 3D animation and modelling software, image editing software, or combinations thereof, used for creating the 3D assets which are then imported to a real-time 3D scene editor. In real-time 3D scene editors (e.g., Unity or Unreal), a content author builds an XR experience by combining imported 3D assets, audio files, material definitions, or combinations thereof. Content author also defines the rules of interaction of elements and user input controls that form the logic of the interactive and immersive experience. For 3D graphics assets, content author creates different LoD versions of each asset either by modelling them by hand, or by using some automatic LoD creation tool. LoD creation tools may also be part of one or more real-time 3D scene editors, each of which produce one or more LoD versions as needed when the authored experience is exported to a format that can be used for run-time streaming to the viewing clients. Exemplary images of LoD levels of a single asset seen in FIG. 10 as depicted by haptic fidelity levels 1000A (i.e., objects 1002A, 1002B, and 1002C).

Similar to the 3D asset LoD versions, the content author or the authoring tool also produces different versions of the data needed for the haptics rendering. Different haptics rendering data versions enable haptics rendering with different fidelity levels and with different types of haptics feedback devices with different approaches for generating the haptics feedback. The content author, or the content authoring tool, also links correct versions of the graphics 3D assets with the correct haptics rendering data versions in order to enable the viewing client to know which 3D asset version matches which haptics rendering data asset. When the content author has done the scene construction by assembling the scene from the 3D assets and defined the logic used by the experience, the real-time 3D scene editor exports the experience to the run-time format. In the run-time format, the data needed for distributing the experience is packaged so that it can be distributed to the clients. Content can be distributed to the client as a single content package, or it uploaded to the server and the server can distribute the data as a package or by streaming individual elements of it to the clients. In the case of XR experiences, run-time data includes different versions of the graphics, audio, haptics, asset, scene graph or graphs describing one or more scene structures, associated logic for each of the one or more scene structures, or combinations thereof. In case of streaming approach, run-time data can use separate MPD that defines available versions of asset data (e.g., resulting in different user experiences as characterized by haptic feedback response levels 1000B, shown as hand haptic response levels 1004A, 1004B, and 1004C).

MPEG-DASH is used as an example to show how metadata can be formulated and carried in an applicable format. For interactive, low-latency applications, other appropriate standards are certainly more likely to be deployed to accommodate real-time interaction such as in cloud gaming, VR/AR cloud rendering, or combinations thereof. For the purposes of providing an explicit example, FIG. 10 corresponds to three different fidelity levels depicting a range of rendering capabilities with respect to versions of a media asset as drafted by a content author for access by a content server. In some embodiments, more or less fidelity levels may be achievable based on one or more of client device capabilities, user settings or inputs associated with the client device, network strength, or versions of a media asset available via the server based on content authoring iterations or capabilities.

As shown in FIG. 10 by object 1002A, a first fidelity level corresponds to no tactile details and object 1002A comprises a simple geometry that includes enough characterizing data for collision detection between object 1002A and either other objects within a same scene or the user's rendered hand. Hand haptic response level 1004A depicts a hand with a sparse mesh of haptic feedback responses, correspond to the first fidelity level. A second fidelity level also corresponds to no tactile details and object 1002B comprises a polygon mesh for force feedback rendering (e.g., what a user's hand experiences in response to an object in a XR experience contacting the user's rendered hand), and is depicted as having a more refined geometry than object 1002A. Hand haptic response level 1004B depicts a hand with a mesh of haptic feedback responses that is more intense or precise as compared hand haptic response level 1004A, corresponding to the second fidelity level. A third fidelity level corresponds to objects with a surface texture for tactile rendering and object 1002C is depicted with a high polygon mesh for force feedback rendering, where the force feedback rendering of object 1002C is of significantly higher intensity or precision as compared to the force feedback rendering with respect to object 1002B. Hand haptic response level 1004C depicts a hand with a more refined mesh of haptic feedback response as compared to hand haptic response level 1004B, corresponding to the third fidelity level. Rendering of a particular media asset or a particular object or scene of a media asset may fluctuate between two or more of these fidelity levels based on one or more of network strength, device capabilities, or user settings and user inputs to a client device on which the media asset is being rendered.

Figure 11:
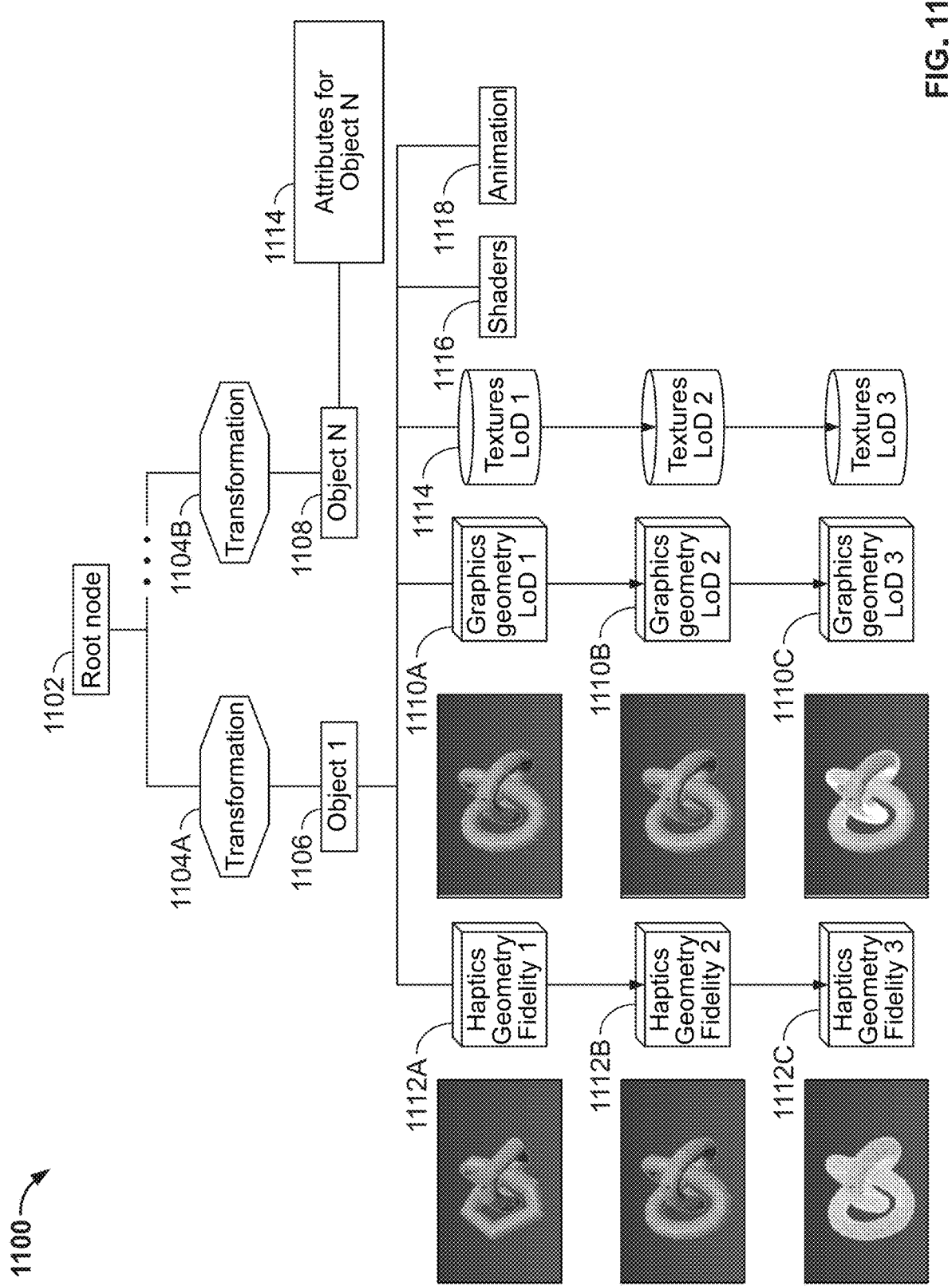
FIG. 11 depicts an example scene graph including nodes of an object transformation tree for objects corresponding to a haptic feedback enabled media asset, in accordance with some embodiments of the disclosure.

FIG. 11 depicts scene graph 1100 including node 1002 of an object transformation tree for objects 1106 and 1108 from a content server storing a haptic feedback enabled media asset, in accordance with some embodiments of the disclosure. Scene graph 1100 may be used by any of the devices and systems described herein in order to executed one or more process blocks of the various processes described herein.

Scene graph 1100 is an example of a structure and behavior of a scene of a media asset requested for rendering at a client device (e.g., a haptics enabled device). The description perceivable by a haptics enabled device or system as characterized by scene graph 1100 is formed as a hierarchical description of spatial relations between scene elements, as well as logic defining interactive behavior of the scene elements. In addition, scene graph 1100 may, in some embodiments, contain information for example related with scene audio, physics, other pertinent details for creating an immersive XR scene, or combinations thereof. A real-time 3D scene editor is used by the content author to assemble the XR experience. With a real-time 3D scene editor, a user of the scene editor may be enabled to combine various content assets together and the user may also define the logic how the assets play together (e.g., where the user is a content author). For enabling the execution of the experience, the real-time 3D scene editor creates a scene graph, such as scene graph 1100, which is a hierarchical representation of the full scene, how individual assets are placed in the full scene, what are the relations between the assets and the logic controlling the interaction.

Although scene graph 1100 is depicted as a singular data structure, individual assets of the data structure, or elements thereof, may remain as isolated files with separate URLs. Multiple files per each media asset, or scene of a media asset, form multiple LoDs for rendering at a client device. Additionally, or alternatively, one or more of the multiple files may correspond to variations of haptics fidelity levels available for a user requesting a particular media asset. Scene graph 1100 may be considered a cookbook of sorts for control or processing circuitry to execute computer readable instructions as scene graph 1100 defines defining how the assets of the data structure are combined to form the full XR or AR experience corresponding to a transmitted version of the media asset that is to be rendered based on scene graph 1100. The format of the scene graph depends on the real-time 3D scene editor and associated viewing application (e.g., depending on which real-time 3D engine is utilized for rendering or authoring). Scene graph 1100 may also be used for transmitting the description of the experience from the editor to the viewing application executing the XR or AR experience for user perception at a client device corresponding to a request for a version of the media asset.

Scene graph 1100 includes various representations of data corresponding to graphics and haptics object definitions and their hierarchical relations. Considering the complexity of data stored and conveyed by scene graph 1100, transformations 1104A and 1104B represent processing done to the various data elements to reduce transmission size while providing instructions for how to unravel or process the data at a viewing client or server. Examples of types of transformations that are represented by transformations 1104A and 1104B include scaling translations, rotation translations, model-global translations of coordinates or reference points, rotational translations (e.g., where data is stored in arrays of different orientations for compact transmission), 2D translations, 3D translations, matrix translations, linear translations, multiplier translations, affine transformations (e.g., linear transformations combined with a matrix or linear translation), projective transformations (e.g., aspects remain in relative positions to each other regardless of data file size), or combinations thereof.

In the illustrated example for first object 1106, both different graphics LoD levels 1110A-C and different haptics fidelity level assets 1112A-C are illustrated. This is also shown for object N 1108 via attributes structure 1114, which is simplified in FIG. 11 for the purposes of depicting a simplified version of a data structure corresponding to scene graph 1100. Audible sensation, or perceptible sound effect, which comes as part of the XR experience may be closely associated with the haptics rendering and feedback. For instance, an operation of fingertips sliding over a surface rendered at different LoDs may generate different sound effects. Without loss of generality, the adaptation of sound effect is considered part of the haptics fidelity. Also conveyed via scene graph 1100 are texture LoDs 1114, shaders 1116, and animation protocols 1118. Each of these provide additional details for rendering a media asset.

Figure 12:
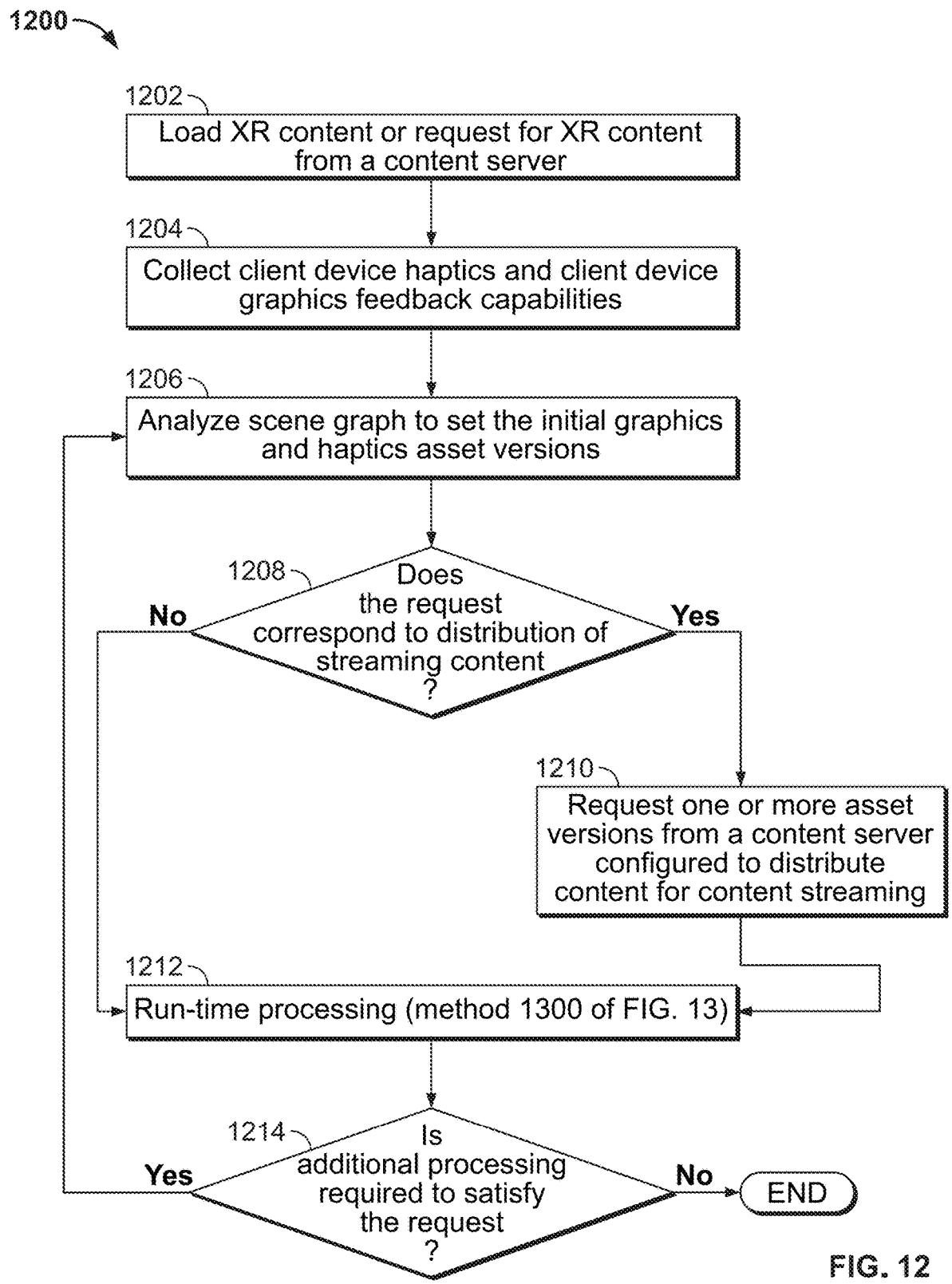
FIG. 12 is a flow chart representing an illustrative process for processing a media asset based on haptic feedback settings of a haptic enabled client device, in accordance with some embodiments of the disclosure.
Figure 13:
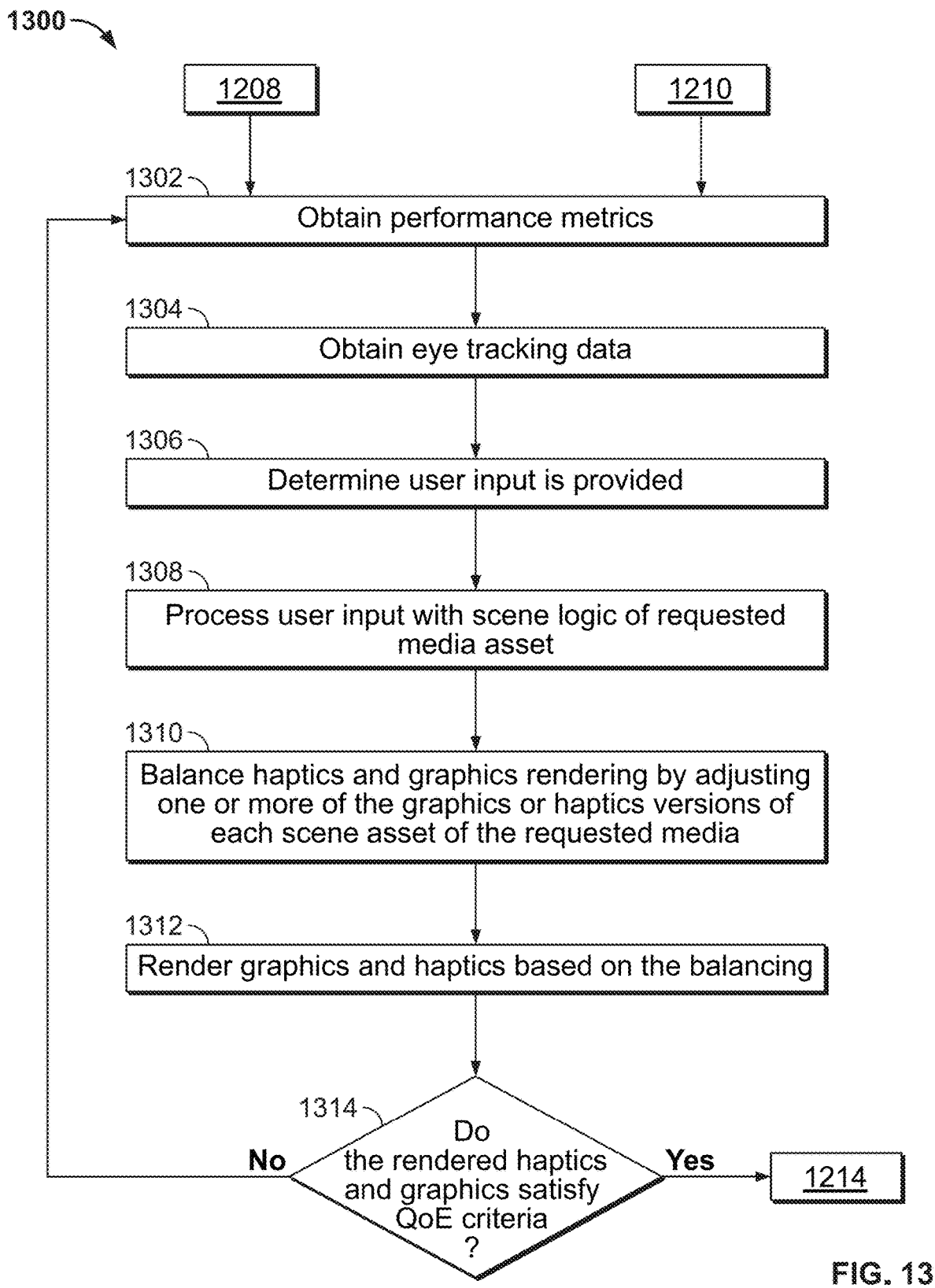
FIG. 13 is a flow chart representing an illustrative process for identifying haptic feedback settings for rendering a haptic enabled media asset on a haptic enabled client device, in accordance with some embodiments of the disclosure.
Figure 14:
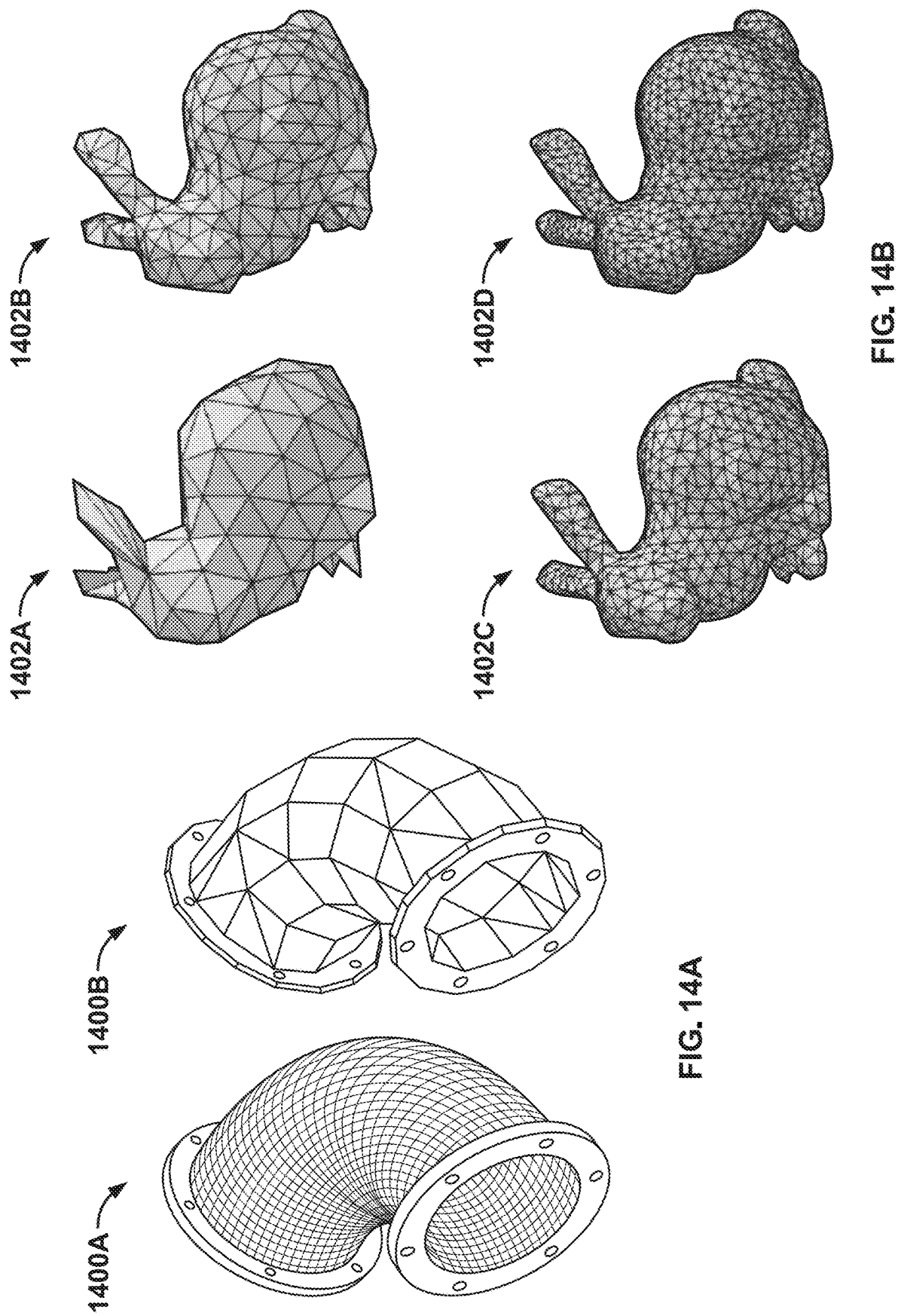
FIG. 14A depicts different versions of a rendered object based on haptic feedback settings of a haptic enabled client device, in accordance with some embodiments of the disclosure.
FIG. 14B illustrates different versions of an object that can be rendered via a haptic enabled client device based on haptic feedback settings corresponding to the haptic enabled client device, in accordance with some embodiments of the disclosure.

FIG. 12 is a flow chart representing process 1200 for processing a media asset based on haptic feedback settings of a haptic enabled client device, in accordance with some embodiments of the disclosure. As shown in FIG. 12, at process block 1212 process 1300 of FIG. 13 is utilized to complete this aspect of process 1200. Process 1200 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

Process 1200 illustrates the processing executed by one or more of the viewing clients described in this disclosure. The process executed by the viewing client starts when a user launches the application implementing the viewing client. When a user starts the application, the user also defines the content to be viewed. Content can be a link to a download package or a scene description residing on the content server in the case of content streaming approach. A viewing client application is launched either by explicit command by the user or automatically by the operating system based on identifying content type request and application associated with the specific content type. In addition to being a stand-alone application, a viewing client can be integrated with a web browser or a social media client or it can be part of the operating system.

As the viewing client starts the execution, it also collects information about haptics and graphics capabilities of the client device. Haptics capabilities the client collects define what type of feedback the haptics feedback devices can provide, fidelity and force limitations of the feedback, operational limits of the device, update frequency, or combinations thereof. Graphics capabilities determine the processing capabilities of graphics processing unit (hereinafter "GPU"), or one or more of the processing circuitry or control circuitry described herein, of the client device. Collection of haptics and graphics capabilities is done only once at the application launch as they are not expected to change during a single use session. Before starting the run-time processing, the viewing client selects the initial asset versions to be used at the beginning of the run-time execution of the XR experience. Viewing client selects the initial asset versions by inspecting the information about available asset version contained in the scene graph, or, in some embodiments, the MPD. The viewing client sets the initial haptics asset versions to match the haptics capabilities of the client device and low enough fidelity level to ensure client processing performance is not exceeded. For the graphics assets, the viewing client sets the initial asset versions low enough LoD versions to ensure the client processing performance is not exceeded. In the case of streaming content distribution, the viewing client proceeds to request the initial asset versions from the content server and moves to the run-time processing stage only once the assets have been received. The viewing client continuously executes the run-time processing until the end of processing is requested. The end of scene processing can be requested by the user, content logic, operating system, or combinations thereof.

At process block 1202, XR content, or a request for XR content, is loaded from a content server. At process block 1204, client device haptics and client device graphics feedback capabilities are collected. At process block 1206, a scene graph (e.g., corresponding to the XR content or the request for XR content), is analyzed to set the initial graphics and haptics asset versions (e.g., a version of the XR content with rendering instructions is identified for transmission to a client device). At decision block 1208, the request is reviewed to determine if the request corresponds to distribution of streaming content. If it is determined that the request does correspond to distribution of streaming content (YES at 1208), the one or more asset versions from a content server, the content server being configured to distribute content for content streaming, are requested at process block 1210, which then results in execution of process block 1212. If it is determined that the request does not correspond to distribution of streaming content (NO at 1208), then run-time processing is executed at process block 1212. Process block 1212 represents method 1300 of FIG. 13, which is discussed in detail in the following description of FIG. 13.

At decision block 1214, the request is reviewed to determine if additional processing (e.g., beyond run-time processing that was executed at process block 1212), is required to meet the criteria of the request (e.g., the XR content has been completed or exited out of with an acceptable QoE score). If it is determined that additional processing is required to satisfy the request (YES at 1214), then process block 1206, and the process blocks that follow in FIG. 12, is revisited for additional processing related to the request. If it is determined that additional processing is not required to satisfy the request (NO at 1214), then process 1200 ends.

FIG. 13 is a flow chart representing process 1300 for identifying haptic feedback settings for rendering a haptic enabled media asset on a haptic enabled client device, in accordance with some embodiments of the disclosure. Process 1300 may be executed at process block 1212 of FIG. 12. Process 1300 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

In the run-time processing phase, the viewing client continuously executes a loop in which it collects the performance metrics, collects and processes input and adjusts the haptics and graphics assets to balance the performance and to optimize the QoE. FIG. 13 illustrates the run-time processing performed by the viewing client (e.g., as part of the processing performed while executing method 1200 of FIG. 12). Performance metrics include measures of the rendering framerate, processing time, and combinations thereof, required by the rendering of a particular version of a media asset (e.g., XR or AR content) as well as one or more of CPU or GPU processing loads. Based on these performance metrics the viewing client determines if the overall processing load can be increased by switching assets (e.g., a different version of a requested media asset) to versions with one or more of higher LoD or higher haptics fidelity levels. On the other hand, the performance metrics can also indicate that the viewing client is closing on exceeding the available processing performance limitations, in which case the overall rendering load needs to be decreased in order to avoid lag in the content update.

If the client device provides eye tracking data, the viewing client requests up-to-date eye tracking result which the viewing client can use in the asset version selection. For example, XR devices (e.g., Varjo XR-3), have integrated eye tracking, and the data can be used to make more accurate asset version prioritization in the adjustment phase. Eye tracking can be used also by the viewing client as a scene interaction input. For the scene update processing, the viewing client collects all other user input, such as hand or controller tracking, head tracking, button presses, or combinations thereof. Once the user input is collected, the viewing client performs the scene update in which the user input and scene logic are processed, and the scene states are updated accordingly.

When the performance metrics and user input, including eye tracking data if available, have been collected and the scene has been updated, the viewing client can perform the haptics and graphics rendering balancing. In the case of multiple users joining a shared XR experience, the client process runs individually on each individual viewing client executed on the different users' devices. In such a case involving more than one user, the solution will balance haptics and graphics rendering individually, maximizing the QoE of each user according to the device capabilities and context of each individual user. This will lead to a situation where some users will use different graphics LoD level and haptics fidelity level version assets compared to the other users in the same session. This way, each user can have the experience optimized specifically for them and there is no need for communicating the assets versions used across the clients.

As described in reference to FIG. 12, the run-time processing characterized by FIG. 13 occurs subsequent to either process block 1208 or process block 1210 being executed. At process block 1302, performance metrics are obtains (e.g., by a content server from a client device). At process block 1304, eye tracking data (e.g., as collected by the client device), is obtained (e.g., also by the content server). At process block 1306, it is determined that a user input is provided (e.g., selection of a media asset for consumption or interaction). At process block 1308, the user input is processed with the scene logic of the requested media asset. For example, if the user input includes preferences regarding graphics or haptics rendering resolutions, those would be processed as part of identifying a version of the media asset to provide and also is used to confirm how much or which kind of data corresponding to individual scenes of the media asset to transmit for rendering at the client device. At process block 1310, the haptics and graphics rendering is balanced by adjusting one or more of the graphics or haptics version of each scene asset of the request media asset (e.g., a lower resolution file of certain scene elements of the media asset may be provided instead of a higher resolution to avoid a reduction in QoE score based on excess buffering or lag). At process block 1312, the graphics and haptics of the requested media asset are rendered based on the balancing, and processing resulting therefrom, that occurred via process block 1310.

At decision block 1314, the rendered haptics and graphics are compared to QoE criteria (e.g., based at least in part by user interaction with the rendered version of the requested media asset). If it is determined the rendered haptics and graphics do not satisfy the QoE criteria (NO at 1314), then process block 1302 is revisited. For example, the graphics may be considered acceptable, but the haptics feedback experienced by the user were inconsistent and did not yield an immersive experience for the user while interacting with a particular scene. Therefore, one or more of the content server or client device may repeat a majority of process 1300 to provide an updated or improved experience to the user in order to achieve a target QoE score. If it is determined the rendered haptics and graphics do satisfy the QoE criteria (YES at 1314), then decision block 1214 of FIG. 12 is executed.

FIG. 14A depicts rendered objects 1400A and 1400B based on haptic feedback settings of a haptic enabled client device, in accordance with some embodiments of the disclosure. Rendered objects 1400A and 1400B may be generated for display and interaction (e.g., rendered at a client device for user interaction) based on the execution of one or more methods of this disclosure by one or more systems or devices of this disclosure.

When the viewing client requests for content based on rendering capabilities of the viewing client or client device (e.g., in response to a user request for a media asset corresponding to an AR or XR experience), a single object or asset is expected to be rendered to the object's optimal visual representation and tactile sensations for an immersive experience for the user. Optionally, the optimal visual and tactile representation of the object may correspond to a measurement of how many polygons that the device is able to render in time. In an XR collaboration, the visual display of the two objects shown in FIGS. 14A and 14B will lead to differentiated haptic simulations. Rendered object 1400A is expected to be perceived at a user end as comprising much smoother tactile feedback (e.g., a smooth touch sensation as experienced by the user) when simulating the sense of touch for the user via, for example, a hand mounted or hand held haptic feedback device.

In the case of rendering multiple objects in a session, the viewing client may optimize the graphics rendering and haptics simulation for the target object which the user interacts with. In other words, the consistency of visual and haptics experiences is to be prioritized for the target object. Compromises are made for the rendering of other objects, which, in some embodiments, results in rendered object 1400B which is expected to be perceived at a user end as comprising less smooth or course tactile feedback when compared to how rendered object 1400A is perceived at a user end. The optimization and prioritization can be different for the same content rendered on different viewing clients. Different users may interact with objects in a collaborative session so that the requirements on matching the visual and haptics experiences may vary for remote participants (e.g., some user may prefer settings resulting in rendered object 1400B, as opposed to rendered object 1400A, depending on preferences the user has with regard to AR or XR assets as experienced via a user particular client device).

FIG. 14B illustrates rendered objects 1402A-D, each of which can be rendered via a haptic enabled client device based on haptic feedback settings corresponding to the haptic enabled client device, in accordance with some embodiments of the disclosure. As discussed in reference to FIG. 14A, each of rendered objects 1402A-D correspond to different feedback response and graphics experiences that different users may prefer, or experience based on various factors discussed in reference to this disclosure. Where AR or XR experiences are shared across multiple client devices in coordinated viewing sessions, rendered objects 1402A-D correspond to different haptic and graphics renderings of a same object across different devices and different settings (e.g., during shared sessions or independent sessions in view of one or more of network strength, device capabilities, user settings, or combinations thereof).

Figure 15:
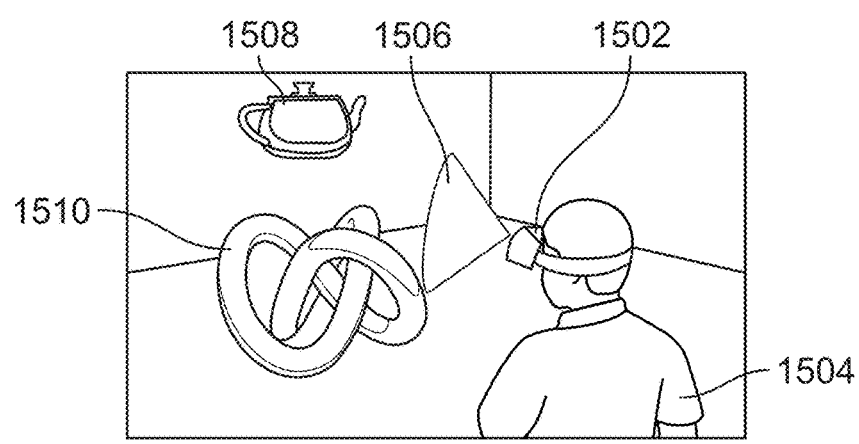
FIG. 15 illustrates a scenario where object rendering within a haptics enabled media asset is based on a user's interaction with different objects, in accordance with some embodiments of the disclosure.

FIG. 15 illustrates scenario 1500 where object rendering within a haptics enabled media asset is based on a user's interaction with different objects, in accordance with some embodiments of the disclosure. Scenario 1500 may be executed using one or more of the devices or systems of this disclosure, wherein one or more of the processes of this disclosure are executable (e.g., based on a non-transitory computer readable medium comprising non-transitory units of this disclosure) by the one or more systems of this disclosure in order to result in scenario 1500.

Scenario 1500 corresponds to a use case where user 1504 has requested a media asset configured for an immersive AR or XR experience with one or more outputs of haptic feedback and one or more aspects of graphic presentation to be rendered for interaction via client device 1502 (e.g., a client device configured for graphic image or video rendering and also configured to provide haptic feedback for user perception). As shown in FIG. 15, user 1504 has range of focus 1506 which corresponds to user 1504 inspecting a simple XR experience consisting of two virtual objects, moderate resolution teapot 1508 and moderate resolution torus knot 1510. Both objects have varying graphics LoD levels and haptics fidelity levels defined in a scene graph (e.g., scene graph 1100 of FIG. 11) depending on which surface of each object is visible to user 1504 via range of focus 1506 and how close user 1504 stand relative to each object (e.g., as determined by protocols defining the AR or XR experience). As the experience is first rendered for interaction and user 1504 begins interacting with the experience, user 1504 is inspecting the scene by just looking around, without fixating or focusing on a particular part, space, or object of the experience. Additionally, user 1504 is depicted as not interacting, inspecting, or touching any particular object or surface rendered in the experience. As described at least in reference to FIGS. 12 and 13 of this disclosure, scenario 1500 illustrates a balances the graphics rendering and haptics rendering of each of moderate resolution teapot 1508 and moderate resolution torus knot 1510 by using the minimal haptics fidelity level for both objects, as the user is not touching any objects to feel them, and using moderate graphics LoD level across each object as the user is not visually inspecting any specific object nor is the user directly interacting with either. As discussed in reference to FIG. 11, a scene graph corresponding to the experience generated for scenario 1500 may be utilized to determine haptic and graphic resolutions based on interactions between user 1504 and the depicted objects or environment.

Figure 16:
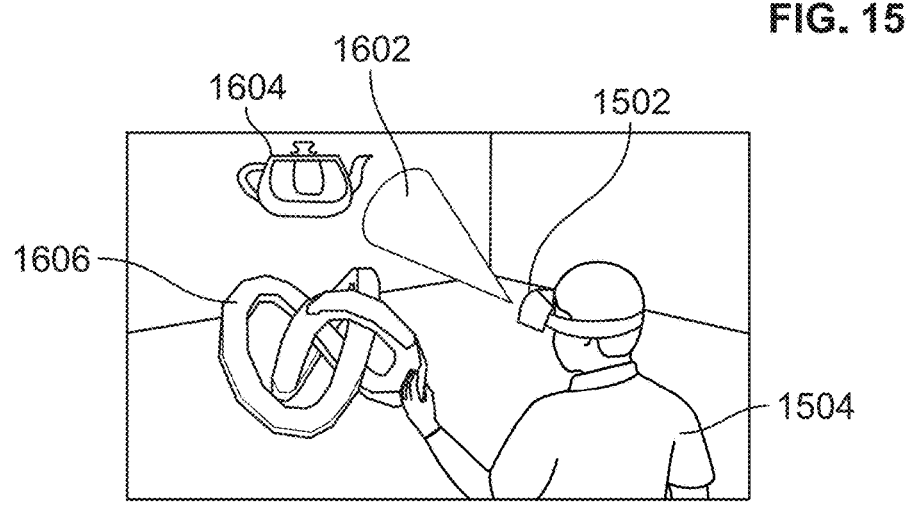
FIG. 16 illustrates a scenario where object rendering within a haptics enabled media asset is based on a user's interaction with different objects, in accordance with some embodiments of the disclosure.

FIG. 16 illustrates scenario 1600 where object rendering within a haptics enabled media asset is based on a user's interaction with different objects, in accordance with some embodiments of the disclosure. Scenario 1600 may be executed using one or more of the devices or systems of this disclosure, wherein one or more of the processes of this disclosure are executable (e.g., based on a non-transitory computer readable medium comprising non-transitory units of this disclosure) by the one or more systems of this disclosure in order to result in scenario 1600.

Scenario 1600 is an example of how balancing haptic and graphic rendering of an AR or XR experience can be modified during a viewing session by user 1504 based on interactions between user 1504 and the depicted objects. As shown in FIG. 16, user 1504 has a range of focus 1602 that indicates user 1504 is focused on high graphics resolution teapot 1604, while user 1504 is also touching (e.g., within the experience based on inputs from a hand mounted device or sensor) high haptics resolution torus knot 1606 for gaining a tactile sense of high haptics resolution torus knot 1606 without including high haptic resolution torus knot 1606 in range of focus 1602. In this situation, the haptics and graphics rendering balance, as enabled by one or more processes and devices of this disclosure, selects to use the maximum graphics LoD level and minimum haptics fidelity level for high graphics resolution teapot 1604 (as user 1504 is focused on high graphics resolution teapot 1604 without touching the object), and using maximum haptics fidelity level and minimum graphics level for high haptics resolution torus knot 1606 (as user 1504 is touching high haptics resolution torus knot 1606 without looking at the object). This provides an example of how haptics may have a different resolution than graphics of any particular element of a scene of a media asset based on inputs from user 1504 of client device 1502.

Figure 17:
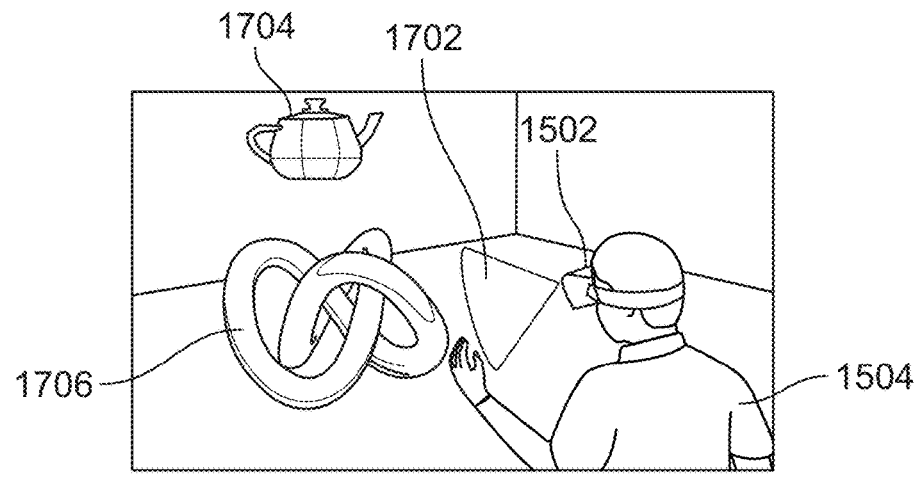
FIG. 17 illustrates a scenario where object rendering within a haptics enabled media asset is based on a user's interaction with different objects, in accordance with some embodiments of the disclosure.

FIG. 17 illustrates scenario 1700 where object rendering within a haptics enabled media asset is based on a user's interaction with different objects, in accordance with some embodiments of the disclosure. Scenario 1700 may be executed using one or more of the devices or systems of this disclosure, wherein one or more of the processes of this disclosure are executable (e.g., based on a non-transitory computer readable medium comprising non-transitory computer readable instructions accessible or stored via one or more processors or processing units of this disclosure) by the one or more systems of this disclosure in order to result in scenario 1700.

Scenario 1700 corresponds to a scenario where user 1504 of client device 1502 is touching and looking directly at high haptics high graphics resolution torus knot 1706 in order to receive high resolution visual and haptic feedback, without looking directly at or interacting with low graphics resolution teapot 1704. In this situation, a minimum graphics LoD version asset and a minimum haptics fidelity level asset may be employed during rendering of the experience depicted for all other objects besides the one being touched and looked at (e.g., high haptics high graphics resolution torus knot 1706) to avoid excessive processing without improving a QoE score or improving a level of immersion for user 1504. In order avoid discrepancy between haptics and visual feedback that will be within the performance limits of client device 1502 with respect to rendering capabilities, more processing power is directed to high haptics high graphics resolution torus know 1706 than any other object or element of the experience.

FIG. 18 is a flow chart representing process 1800 for balancing haptic feedback rendering and graphics rendering of different aspects of a media asset, in accordance with some embodiments of the disclosure. Process 1800 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

Process 1800 illustrates processing executed by the viewing client for balancing haptics and graphics rendering in case of scene consisting of multiple assets. A core idea of the balancing is that for object that are being both inspected by touching and looking, the maximum haptics fidelity level matching the client device capabilities should be used with a graphics LoD version matching the haptics fidelity level version. For objects that are only being looked at, the goal is to use high LoD level for maximizing the visual richness. Objects that are only being touched, such as control panel of an airplane manipulated without looking at it, the goal is to use the highest haptics fidelity level while the graphics LoD version does not need to match the haptics fidelity version.

The process of a user intention inferring is determining what are the assets the user is touching and what are the assets the user is looking at. With gesture recognition done based on the user input analysis, assets that the user is actively inspecting by touching them are identified. Similarly, if there is eye tracking available, eye tracking data is analyzed to identify objects that the user is currently focusing their gaze on (e.g., object within a range of focus or line of sight). For example, in scenes with high tempo activity and multiple objects that the user needs to manipulate, the user might not be inspecting any specific asset by touching nor looking at anything specific and the rendering can be more evenly distributed to optimize the performance for the specific context.

At process block 1802, total performance requirements are calculated with the current asset versions. For example, a QoE may be determined based on one or more of device capabilities, user inputs or preferences, or wireless signal strength to determine if the current asset versions are the most compatible of available asset versions with the current user state (e.g., based at least in part on user activity and a current client device). Process blocks 1804 and 1806 may both be executed simultaneously after process block 1802, or either of process blocks 1804 or 1806 may be performed before the other. At process block 1804, a user input corresponding to current asset versions is received. At process block 1806, a current scene state is determined (e.g., current progress in a requested media asset or a QoE score is determined for a current scene being rendered for user interaction). At process block 1808, a user intention is predicted with respect to the current scene based at least one the current scene state and the received user input. For example, a user may look towards and object and then may start to reach for the object in the experience. While executing process 1800, a device or system may then predict the user intends to grab the object the user is reaching for while looking at it and may perform subsequent steps of process 1800 based on the prediction. At process block 1810, flags for prioritization, which are provided with current asset versions, to an "off" state in view of the predicted user intention. For example, a media asset MPD may mark certain aspects of a scene or an object as something to have high graphics or haptics feedback resolution by default (e.g., something a user carries around). A user may, however, provide inputs indicating the user wants high resolution (e.g., graphically or haptic feedback related) for a different aspect of the media asset (e.g., the user wants to carry around a different object during the experience). Therefore, according to process block 1810, the default prioritization flags for particular assets may be switched off to avoid prioritization of rendering for something the user is not interested in to avoid, for example, a reduction in a QoE score.

Subprocess 1830 of process 1800 is to be performed on each asset of a requested XR experience or media asset. For example, where there are multiple scenes, objects, or environments, each of the aforementioned assets would be subjected to subprocess 1830, either collectively or independently. In some embodiments, subprocess 1830 may be performed on assets a user is directly focused on or a user is predicted to focus on. In some embodiments, subprocess 1830 is performed on the entire set of assets prior to a user beginning a requested experience. Once the flags for prioritization are set to an "off" configuration at process block 1810, one or more of decision block 1812 and 1814 may be executed contemporaneously or in a progressing order, depending on whether the user input corresponds to touching (e.g., resulting in prioritization of decision block 1812 and process blocks depicted in FIG. 18 thereafter), looking (e.g., resulting in prioritization of decision block 1814 and process blocks depicted in FIG. 18 thereafter), or a combination thereof (e.g., resulting in a mixed prioritization of execution of decision blocks 1812 and 1814 depending user preferences accessible by a client device or content server with respect to prioritization of graphics resolution or haptic feedback resolution).

At decision block 1812, a determination is made if the user is touching an object of the asset (e.g., an object in a scene of a media asset). If it is determined the user is not touching an object (NO at 1812), then, at process block 1816, the lowest haptics fidelity version for device haptics capabilities (e.g., of the client device) are set across all objects of the asset. If it is determined the user is touching an object of the asset (YES at 1812), then a flag is set to prioritize haptics rendering at process block 1818. At process block 1820A, the highest haptics fidelity version suitable for device haptics capabilities is set (e.g., for the client device).

At decision block 1814, a determination is made if the user is looking at an object of the asset (e.g., an object in a scene of a media asset). If it is determined the user is not looking an object (NO at 1814), then, at process block 1824, the lowest graphics fidelity version for device haptics capabilities (e.g., of the client device) are set across all objects of the asset. If it is determined the user is looking at an object of the asset (YES at 1814), then a flag is set to prioritize graphics rendering at process block 1822. At process block 1820B, the highest haptics fidelity version suitable for device haptics capabilities is set (e.g., for the client device).

In some embodiments, the user may be looking at and touching an object of the asset (YES at both process blocks 1812 and 1814). Where this occurs, both haptics and graphics rendering are prioritized at process block 1826 (e.g., resulting in the balancing of rendering discussed in this disclosure). At process block 1828, the highest haptics and highest graphics fidelity versions suitable for the client device haptics capabilities and the client device graphics capabilities are set, but may be subjected to balancing of prioritization of asset rendering based on a QoE score during the session of the viewing dipping below a minimum QoE score.

In response to subprocess 1830 being executed for each asset of a request media asset scene, process 1800 is then progressed to process block 1832. At process block 1832, total performance requires of the client device while rendering the new asset versions is calculated. For example, with the new asset versions, a QoE score is anticipated to increase above a target minimum level. At process block 1834, performance metrics of the client device while rendering the new asset versions are retrieved. At decision block 1836, a determination is made if a reduction in computing requirements for rendering the current version of the asset or assets is required (e.g., based on user input such as fatigue in the eyes as determined from eye tracking or based on device computing performance and the effect of the computing performance on a QoE for the user). If it is determined a reduction in computing requirements of the current asset versions is not required (NO at 1836), then process 1800 is ended. If it is determined a reduction in computing requirements of the current asset versions is required (YES at 1836), then decision block 1838 is used to determine if prioritization flags for both haptics and graphics rendering.

If it is determined prioritization flags are set for both haptics rendering and graphics rendering (YES at 1838), a reduction of the LoD of assets (e.g., both haptics and graphics rendering LoD as conveyed by a MPD of a version of the scene, asset, or media asset) is performed via process block 1840 for assets not being touched or looked at by the user. At process block 1842, updated performance metrics (e.g., of the client device based on a review of an updated user experience with the updated version requested content, assets, or scene), are retrieved. Decision block 1844 is then used to determine if further reductions in computing requirements are needed based on updated performance metrics in view of the newer versions of assets being rendered. If it is determined that further reductions in computing requirements are not needed based on updated performance metrics (NO at 1844), then process 1800 is ended. If it is determined that further reductions in computing requirements are needed based on updated performance metrics (YES at 1844), process block 1846 is repeated until computing requirements are within limits. At process block 1846, a reduction of both haptics and graphics fidelity levels of objects that are only touched or only looked at (e.g., one or the other) by the user is performed until the last determined computing requirements are within acceptable limits to enable the user to continue the immersive experience on the current client device.

If it is determined prioritization flags are not set for both haptics rendering and graphics rendering (NO at 1838), decision block 1848 is used to determine if the graphics rendering prioritization flag is set. If it is determined that the graphics rendering prioritization flag is set (YES at 1848), a reduction in the LoD of graphics of objects is performed via process block 1850, starting with objects not being looked at and progressing towards a foreground of the experience (e.g., objects closest to a user) and continue to object being looked at or tracked by the user's eyes until computing requirements are met (e.g., a QoE target minimum score is achieved based on the progressive reduction in LoD of various graphics). If it is determined that the graphics rendering prioritization flag is not set (NO at 1848), decision block 1852 is used to determine if the haptics rendering prioritization flag is set. If is it determined the haptics rendering prioritization flag is set (YES at 1852), a reduction of the haptics LoD of objects is performed at process block 1854, starting with object not being touched and continued up to objects being touched or soon to be touched (e.g., based on predictions of the user's behavior based on one or more of current or past data corresponding to this media asset or other related media assets) until computing requirements are met (e.g., as discussed above with respect to target QoE scores). If is it determined the haptics rendering prioritization flag is not set (NO at 1852), a balancing of the reduction of haptics LoD and graphics LoD is performed via process block 1856 until computing requirements are met (e.g., in view of target QoE scores).

FIG. 19 is a flow chart representing process 1900 for rendering a haptics enabled asset based on various settings corresponding to a haptics enabled client device, in accordance with some embodiments of the disclosure. Process 1900 may be executed by processing circuitry on a client user device, may be executed at a server (e.g., a server for media content distribution), or combinations thereof (e.g., any of the systems and devices described herein). The various devices and systems described herein may comprise one or more processors with one or more aspects of this, and other processes of this disclosure, encoded thereon by a non-transitory computer readable medium comprising non-transitory computer readable instructions for executing the one or more aspects (e.g., process blocks) of this and other processes of this disclosure, whether the non-transitory computer readable medium includes one or more aspects independently on at least one processor (or processing units thereof), or in combination across instructions store on at least two different processors.

Process 1900 illustrates the data and process flow in an exemplary use session where the user interaction with the scene objects changes (e.g., as is illustrated in FIGS. 15-17). For a single user, this is a coordinated optimization of visual and haptics rendering to ensure an optimal immersive experience. In the case of a collaboration by multiple users, the balancing in rendering visual and haptics levels may be extended to ensure better consistency of experiences among the participants. However, the varying capabilities among different devices must also be considered in order to maintain an appropriate QoE for each user. In one embodiment, the common denominator, or the lowest, of visual and/or haptics rendering capability can be identified and communicated to the others as the constraints applied to the rendering, to allow the participants to experience similar effects.

In one embodiment, the participant who has a less capable device may be identified so that the variations in the rendering of visual and haptics on this device will be used to guide the corresponding rendering on the other viewing clients. When a downgrade becomes necessary, a notification through UI may be prompted to the other users. This adaptation is dynamic since this participant may look at and touch different objects at different times. In another embodiment, the participant who has the best capable device may be identified so that one or more of the best visual or haptics experiences may be communicated to the others. This way, each of the other viewing clients may understand the best experience in the session and assess the feasibility of achieving the best experience on a reduced set of objects. For instance, a less capable device may find difficulty rendering the best for two close objects at a same time. It may then advise the user to separate the objects in a distance that the user is still able to experience the best of each object. This again is a coordinated experience in the collaboration with others (i.e., moving and rotating objects is perceived in synchronization among clients).

At process block 1902, a request to load XR content for user interaction at a client device is received. At process block 1904, a scene graph is retrieved that corresponds to XR content from the request. At process block 1906, client device haptics feedback capabilities are collected. At process block 1908, asset versions for rendering at the client device are selected based at least in part on the retrieved scene graph (e.g., in some embodiments, user settings or user preferences accessible via the client device). At process block 1910, asset versions are loaded for execution of XR content for user interaction. At process block 912, performance metrics for the XR experience of the user are determined based at least in part on the executed asset versions. In some embodiments, one or more of a user input or stored user preference may contribute to the performance metrics. Decision block 1914 is used to determine if the experience performance metrics are acceptable. If it is determined that the XR experience performance metrics are not acceptable (NO at 1914), process block 1908 is used to select new asset versions for rendering at the client device. If it is determined that the XR experience performance metrics are acceptable (YES at 1914), a changed is detected, at process block 1916, in the interaction state of the user associated with one or more of the user touching an object in the experience or the user looking directly at an object in the experience.

Decision blocks 1918A and 1918B may be then executed progressively (e.g., one before the other in either order) or simultaneously. Decision block 1918A determines if the interaction state change corresponds to the user touching an object. If it is determined the interaction state change corresponds to the user touching an object (YES at 1918A), rendering of haptics for the object being touched is prioritized at process block 1920A, over at least graphics rendering of other portions of the experience. If it is determined the interaction state change corresponds to the user touching an object (NO at 1918A), then decision block 1918B is used to determine if the interaction state change corresponds to the user looking at an object. In some embodiments, decision block 1918B is used before decision block 1918A, resulting in at least a partial change in the order of process blocks utilized in at least this paragraph. If it is determine that the interaction state change corresponds to the user looking at an object (YES at 1918B), the rendering of graphics for the object being touched is prioritized at process block 1920B, over at least haptics rendering of other portions of the experience. Process 1900 then proceed to process block 1922, regardless of whether one or both of process blocks 1920A or 1920B is utilized as part of execution of process 1900. At process block 1922, required asset versions that are not yet loaded are applied to the experience such that the active asset versions of the experience being rendered by the client device for user interaction are according to the prioritization corresponding to the user interaction state (e.g., as determined in connection with one or more of process blocks 1918A, 1920A, 1918B, or 1920B). In some embodiments, process block 1912 is revisited during execution of process 1900 after the elements of process 1900 corresponding to process block 1922 are executed.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A method comprising:
   receiving, at a server, a request for a media asset for interaction on a haptic enabled device, wherein the media asset is associated with a plurality of haptic feedback rendering criteria;
   transmitting, from the server to the haptic enabled device, metadata indicating a plurality of versions of the media asset and indicating respective haptic feedback rendering criteria, of the plurality of haptic rendering criteria, for each of the plurality of versions of the media asset;
   receiving an indication from the haptic enabled device identifying a particular version of the plurality of versions of the media asset indicated in the metadata and having haptic feedback rendering criteria that is compatible with haptic feedback capabilities of the haptic enabled device associated with the request; and
   transmitting, from the server to the haptic enabled device, the particular version of the media asset comprising the haptic feedback rendering criteria that is compatible with the haptic feedback capabilities of the haptic enabled device.

2. The method of claim 1, wherein the server is configured to store a plurality of media assets, each media asset of the plurality of media assets comprising at least one haptic feedback rendering criteria.

3. The method of claim 1, wherein at least one of the plurality of haptic feedback rendering criteria comprises one or more of kinesthetic feedback or tactile feedback.

4. The method of claim 3, wherein the tactile feedback corresponds to one or more of texture of an object or response to manipulation of an object in one or more of an augmented or virtual reality display.

5. The method of claim 1, wherein the server corresponds to one or more content providers.

6. The method of claim 1, wherein the server stores at least two versions of the media asset.

7. The method of claim 6, wherein at least one version of the at least two versions of the media asset comprises at least one haptic feedback rendering criteria.

8. The method of claim 1, wherein at least one of the plurality of haptic feedback rendering criteria provides haptic resolution ranges required for the haptic enabled device to display the media asset.

9. The method of claim 1, further comprising:
   determining, based on the comparing, whether the haptic enabled device satisfies a minimum requirement of haptic feedback capabilities for displaying the particular media asset via the haptic enabled device.

10. The method of claim 1, wherein the haptic feedback rendering criteria is stored via the metadata, corresponding to a media presentation description, associated with the media asset.

11. A system comprising:
    a server; and
    a haptic enabled device communicatively coupled to the server, the haptic enabled device comprising processing circuitry configured to interface with processing circuitry of the server, wherein one or more of the processing circuitries are configured to execute instructions to:
    receive, at the server, a request for a media asset for interaction on a haptic enabled device, wherein the media asset is associated with a plurality of haptic feedback rendering criteria;
    transmit, from the server to the haptic enabled device, metadata indicating a plurality of versions of the media asset and indicating respective haptic feedback rendering criteria, of the plurality of haptic rendering criteria, for each of the plurality of versions of the media asset;
    receive, from the haptic enabled device, an indication identifying a particular version of the plurality of versions of the media asset indicated in the metadata and having haptic feedback rendering criteria that is compatible with haptic feedback capabilities of the haptic enabled device associated with the request; and
    transmit, from the server to the haptic enabled device, the particular version of the media asset comprising the haptic feedback rendering criteria that is compatible with the haptic feedback capabilities of the haptic enabled device.

12. The system of claim 11, wherein the server is configured to store a plurality of media assets, each media asset of the plurality of media assets comprising at least one haptic feedback rendering criteria.

13. The system of claim 11, wherein at least one of the plurality of haptic feedback rendering criteria comprises one or more of kinesthetic feedback or tactile feedback.

14. The system of claim 13, wherein the tactile feedback corresponds to one or more of texture of an object or response to manipulation of an object in one or more of an augmented or virtual reality display.

15. The system of claim 11, wherein the server corresponds to one or more content providers.

16. The system of claim 11, wherein the server stores at least two versions of the media asset.

17. The system of claim 16, wherein at least one version of the at least two versions of the media asset comprises at least one haptic feedback rendering criteria.

18. The system of claim 11, wherein at least one of the plurality of haptic feedback rendering criteria provides haptic resolution ranges required for the haptic enabled device to display the media asset.

19. The system of claim 11, further configured to:
   determine, based on the comparing, whether the haptic enabled device satisfies a minimum requirement of haptic feedback capabilities for displaying the particular media asset via the haptic enabled device.

20. The system of claim 11, wherein the haptic feedback rendering criteria is stored via the metadata, corresponding to a media presentation description, associated with the media asset.

\* \* \* \* \*